US012592957B2

(12) United States Patent
Haletky

(10) Patent No.: US 12,592,957 B2
(45) Date of Patent: Mar. 31, 2026

(54) CONTAINERS-BASED FORENSICS FOR PERSISTENT AND STATELESS CONTAINERS

(71) Applicant: Bank of America Corporation, Charlotte, NC (US)

(72) Inventor: Edward L. Haletky, Austin, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/823,346

(22) Filed: Sep. 3, 2024

(65) Prior Publication Data

US 2026/0067318 A1      Mar. 5, 2026

(51) Int. Cl.
H04L 9/40          (2022.01)
H04L 43/02         (2022.01)
(52) U.S. Cl.
CPC .......... H04L 63/1433 (2013.01); H04L 43/02 (2013.01); H04L 63/0254 (2013.01); H04L 63/1425 (2013.01)

(58) Field of Classification Search
None
See application file for complete search history.

(56) References Cited

U.S. PATENT DOCUMENTS

| | | | |
|---|---|---|---|
| 8,887,286 B2 | 11/2014 | Dupont et al. | |
| 11,249,787 B2 | 2/2022 | Haletky | |

| | | | |
|---|---|---|---|
| 11,625,526 B2 * | 4/2023 | Saliba .................. | G06F 16/258 |
| | | | 715/739 |
| 11,705,226 B2 | 7/2023 | Colley et al. | |
| 11,868,495 B2 | 1/2024 | Bednash et al. | |
| 12,041,089 B2 | 7/2024 | Deshmukh et al. | |
| 2009/0288164 A1 * | 11/2009 | Adelstein .............. | H04L 63/123 |
| | | | 726/22 |
| 2012/0137367 A1 | 5/2012 | Dupont et al. | |

(Continued)

FOREIGN PATENT DOCUMENTS

| | | |
|---|---|---|
| CN | 113273146 B | 6/2023 |
| KR | 20210044219 A | 4/2021 |

(Continued)

*Primary Examiner* — Lashonda Jacobs-Burton
(74) *Attorney, Agent, or Firm* — Banner & Witcoff, Ltd.

(57)          ABSTRACT

Comprehensive systems and methods for conducting digital forensics and incident response in containerized computing environments. The system converts stateless containers into persistent containers to prevent automatic termination during forensic investigations. It quarantines the containers using virtual switches and firewalls, captures detailed forensic data including snapshots of all filesystem layers, kernel syscalls, and process data, and mirrors network traffic for secure analysis. The system retrieves logs and artifacts from current and previous nodes, correlates and compares this data using machine learning algorithms, and securely duplicates all artifacts to immutable storage. Automated orchestration ensures consistent execution of forensic processes, and the system reverts containers to their original stateless state post-investigation. A detailed audit log and secure archival of all forensic data are maintained for future reference or legal compliance. The invention addresses the unique challenges of securing and analyzing data in dynamic, distributed containerized environments.

20 Claims, 9 Drawing Sheets

Sample Flowchart for Forensic Process

(56)                    References Cited

U.S. PATENT DOCUMENTS

| | | |
|---|---|---|
| 2014/0096249  A1 | 4/2014 | Dupont et al. |
| 2017/0223047  A1* | 8/2017 | Pogulievsky ......... H04L 63/145 |
| 2018/0189121  A1* | 7/2018 | Jobi ........................ G06F 9/455 |
| 2019/0095620  A1* | 3/2019 | Guri ...................... G06F 21/565 |
| 2021/0090694  A1 | 3/2021 | Colley et al. |
| 2021/0096900  A1 | 4/2021 | Haletky |
| 2021/0306364  A1* | 9/2021 | Vega .................. H04L 63/1425 |
| 2022/0109696  A1 | 4/2022 | Deshmukh et al. |
| 2022/0156396  A1 | 5/2022 | Bednash et al. |
| 2023/0018809  A1 | 1/2023 | Deshmukh |
| 2023/0223121  A1 | 7/2023 | Colley et al. |
| 2024/0037229  A1 | 2/2024 | Pabón et al. |
| 2024/0037259  A1 | 2/2024 | Pabón et al. |
| 2024/0045964  A1 | 2/2024 | Bednash et al. |
| 2024/0080342  A1* | 3/2024 | Mishra Gupta ......... H04L 63/20 |
| 2024/0354136  A1* | 10/2024 | Bhatia ................... G06F 3/0604 |

FOREIGN PATENT DOCUMENTS

| | | |
|---|---|---|
| WO | 2021030419  A1 | 2/2021 |
| WO | 2024025863  A1 | 2/2024 |

* cited by examiner

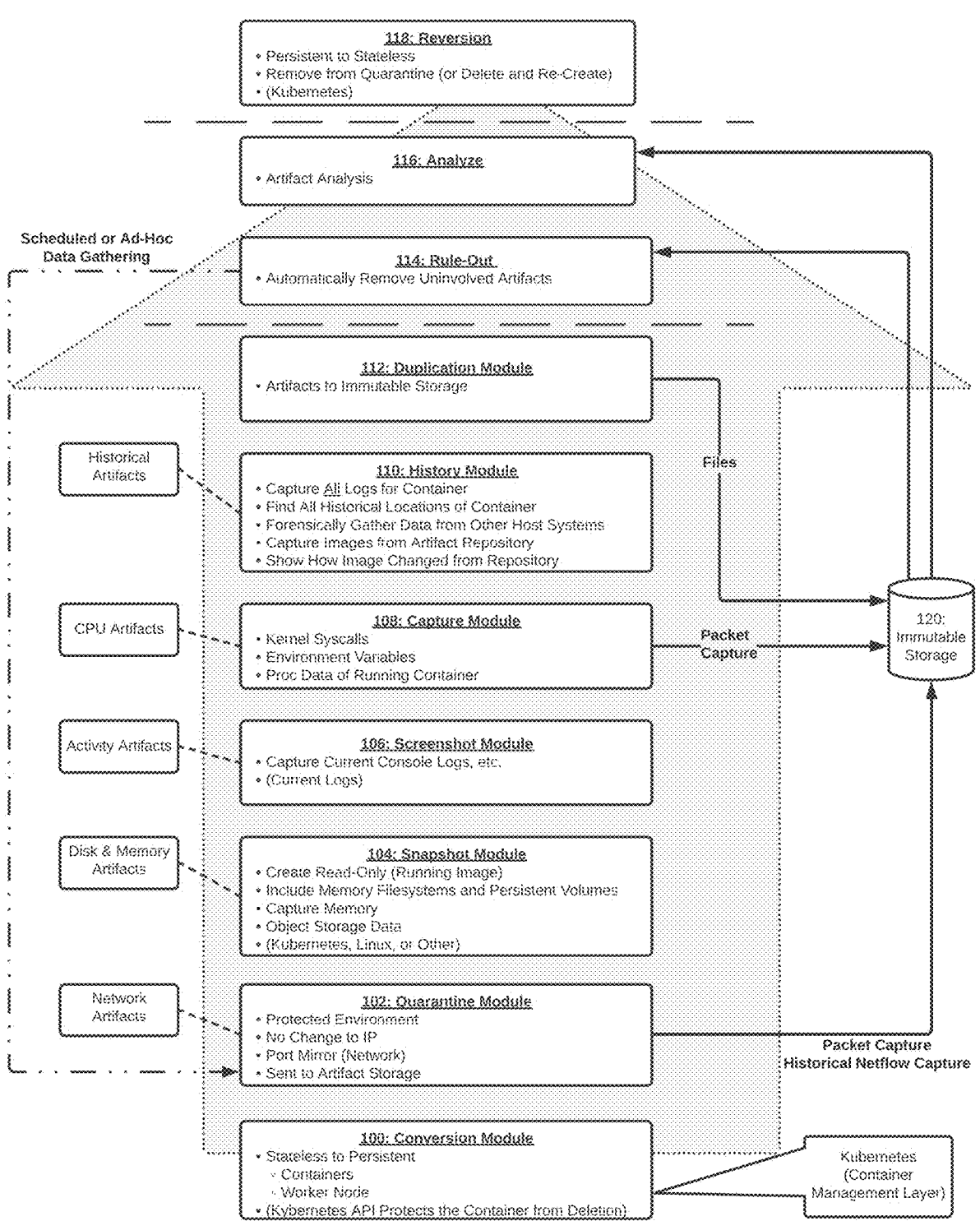
FIG. 1: Sample System Architecture

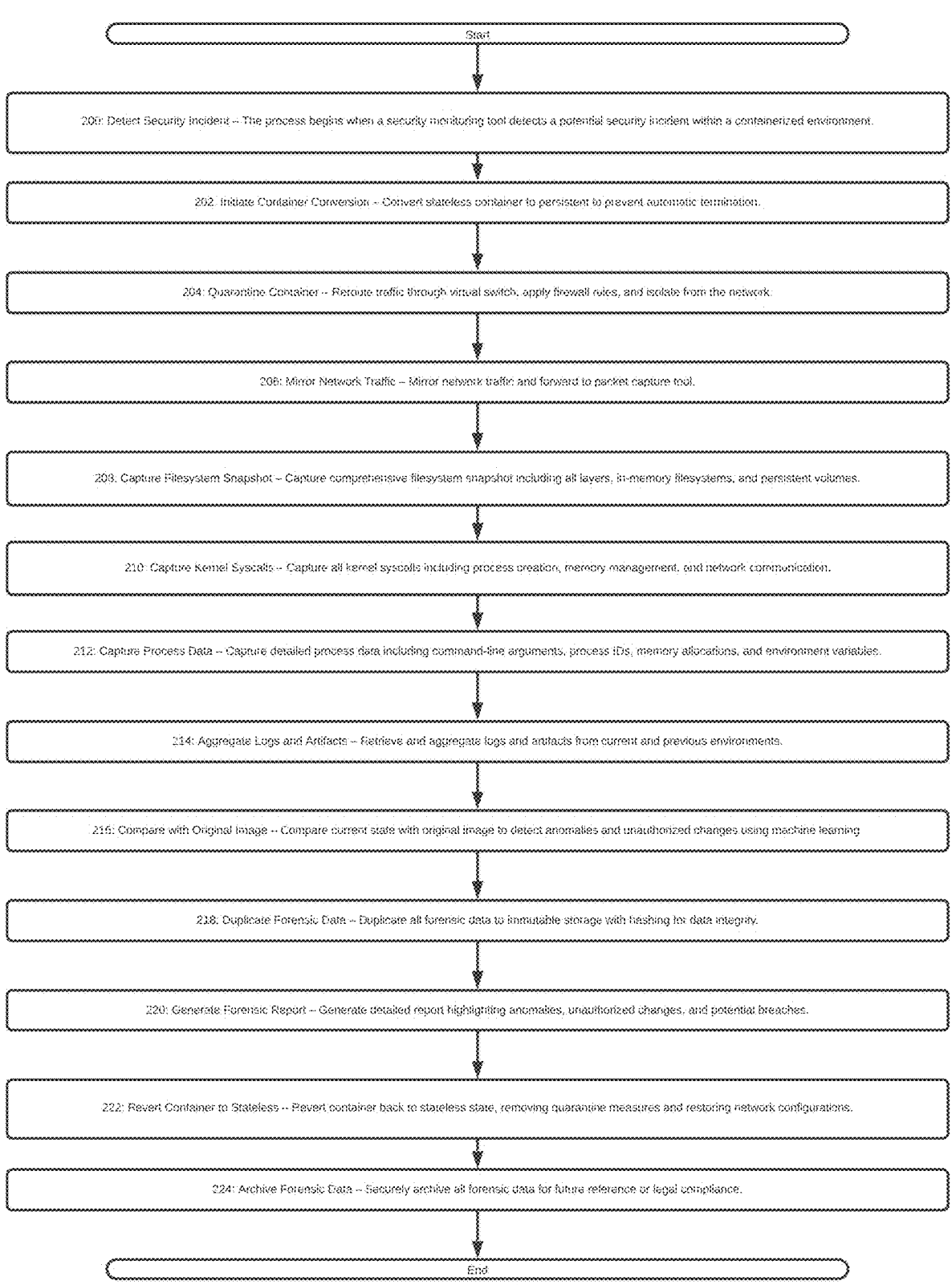
FIG. 2: Sample Flowchart for Forensic Process

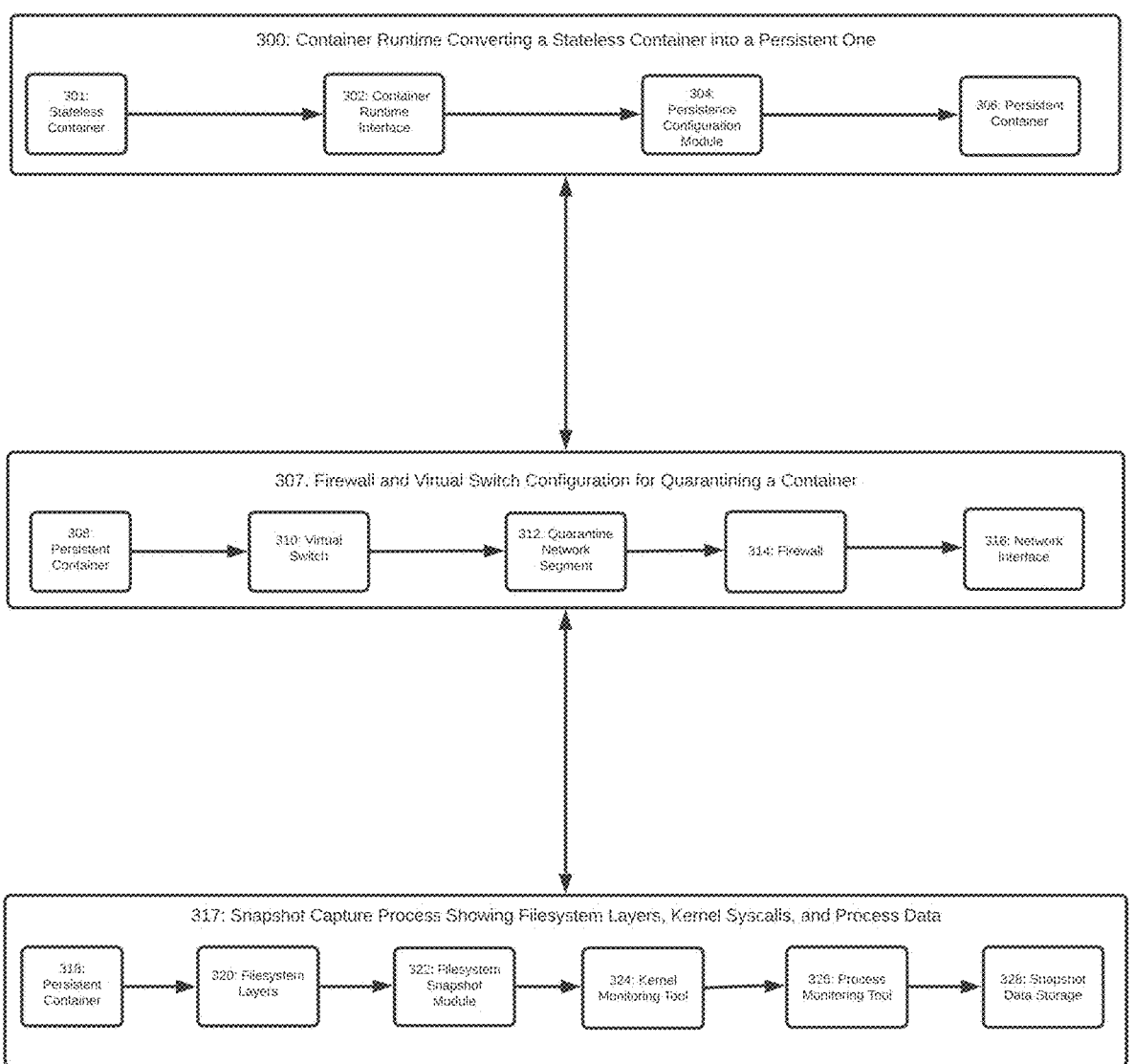
FIG. 3: Sample Components Diagram

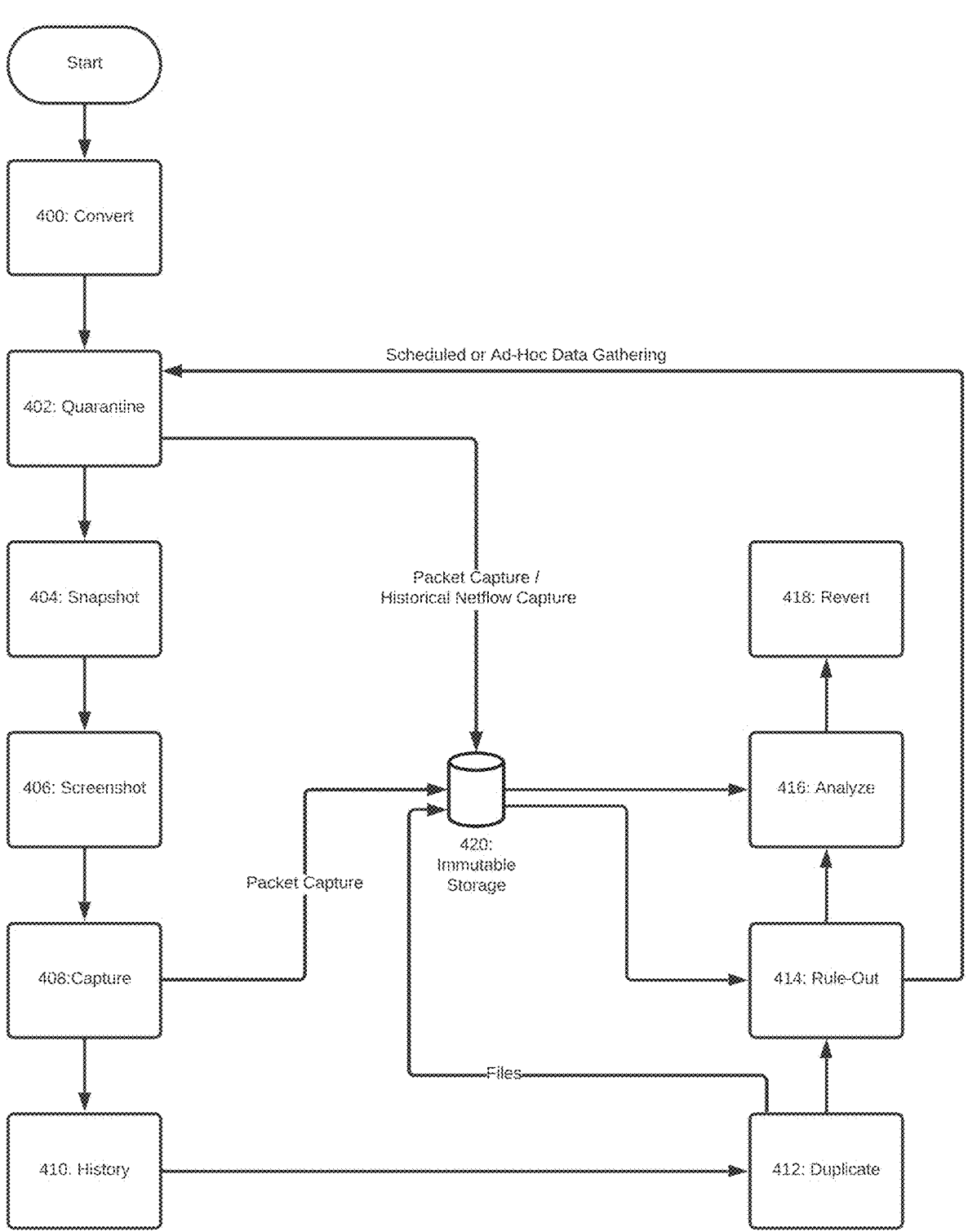
FIG. 4: Sample High-Level Process Diagram

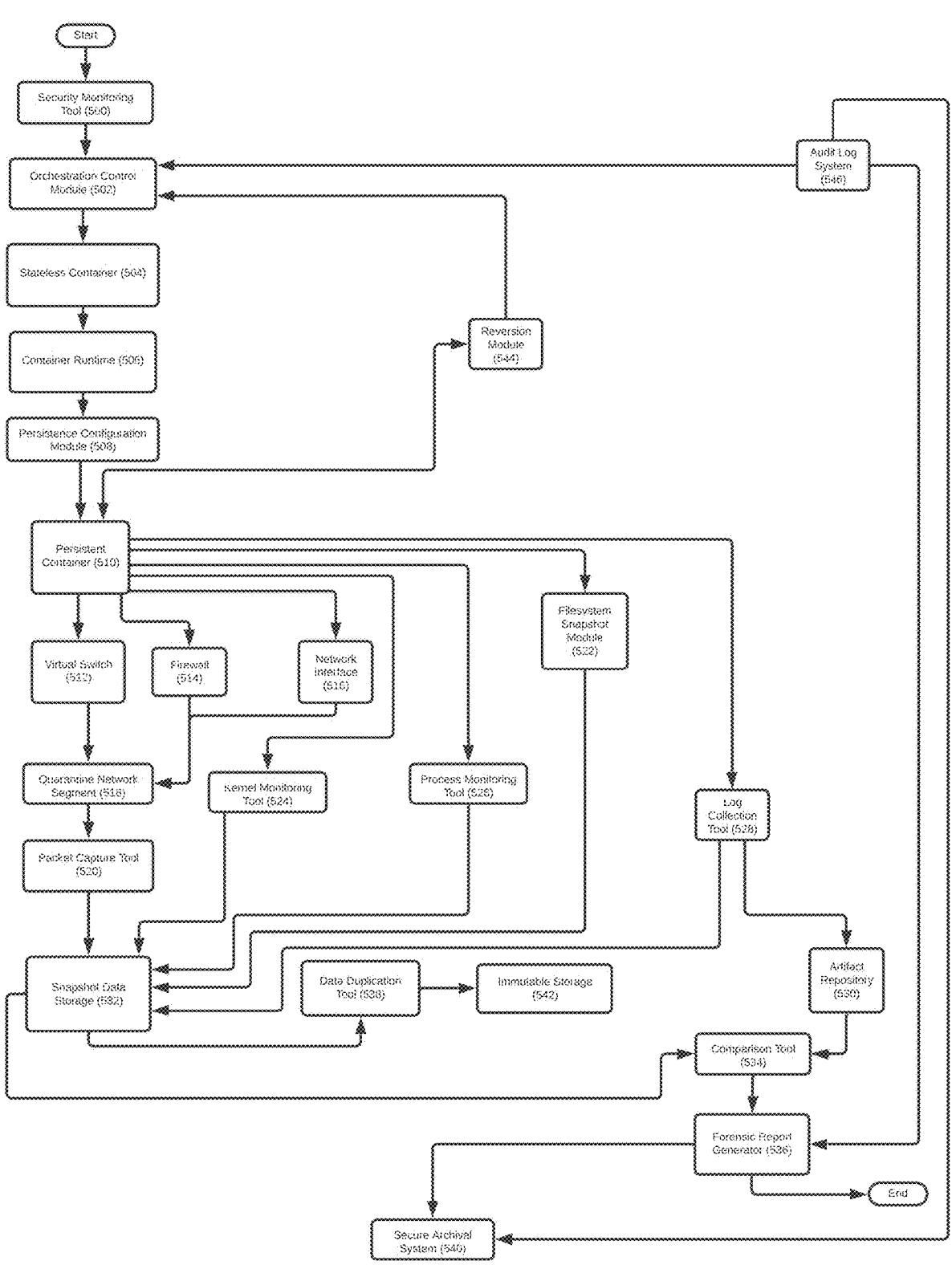
FIG. 5: Sample Interaction Diagram

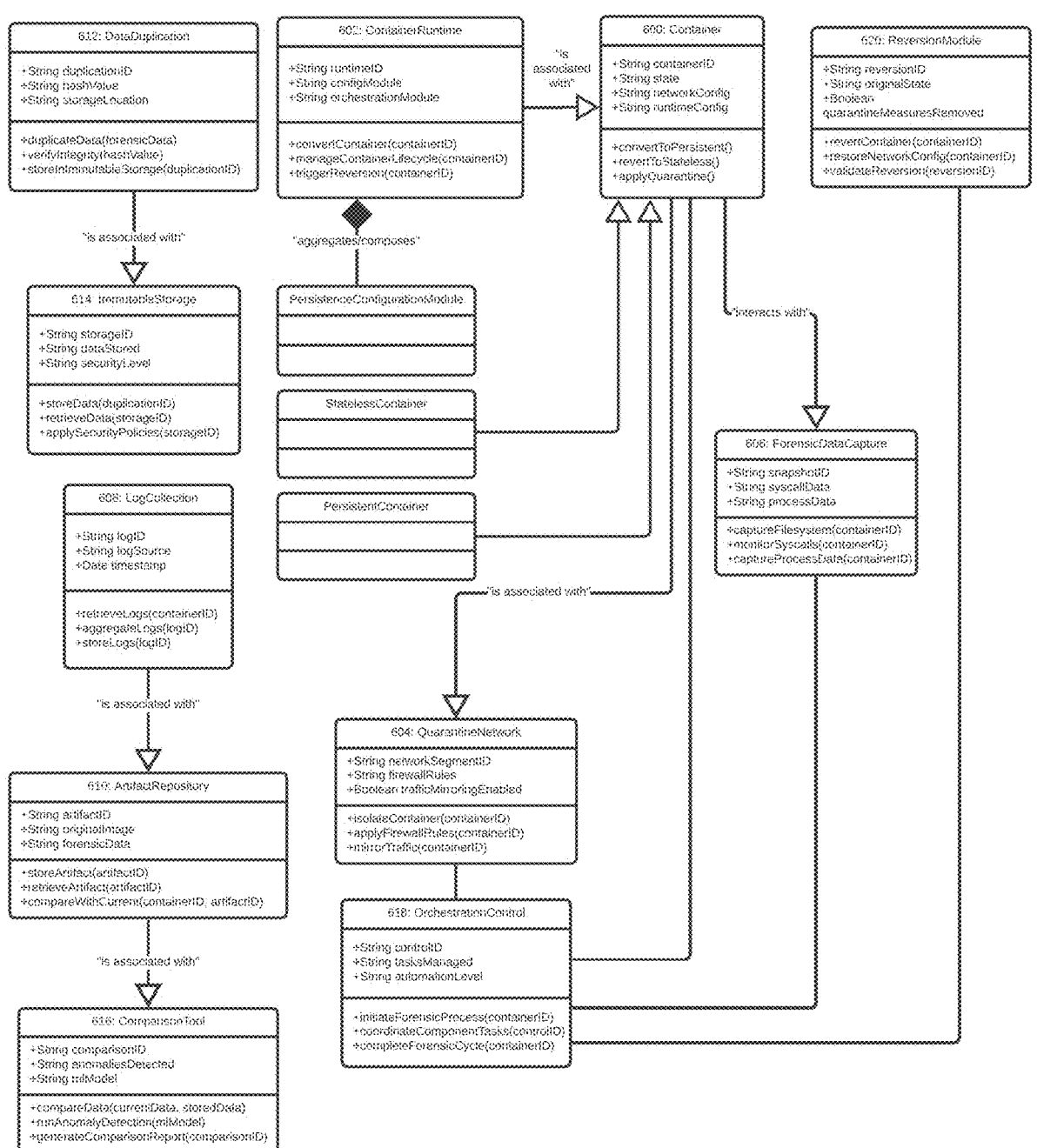
FIG. 6: Sample Class Diagram

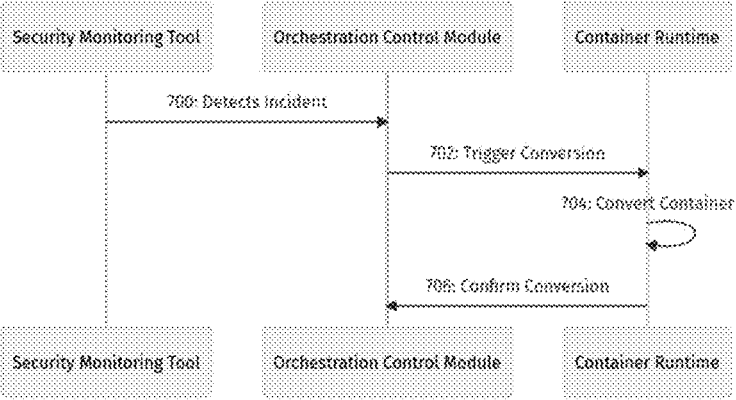
FIG. 7A: Sample Sequence Diagram - Part 1: Incident Detection and Container Conversion
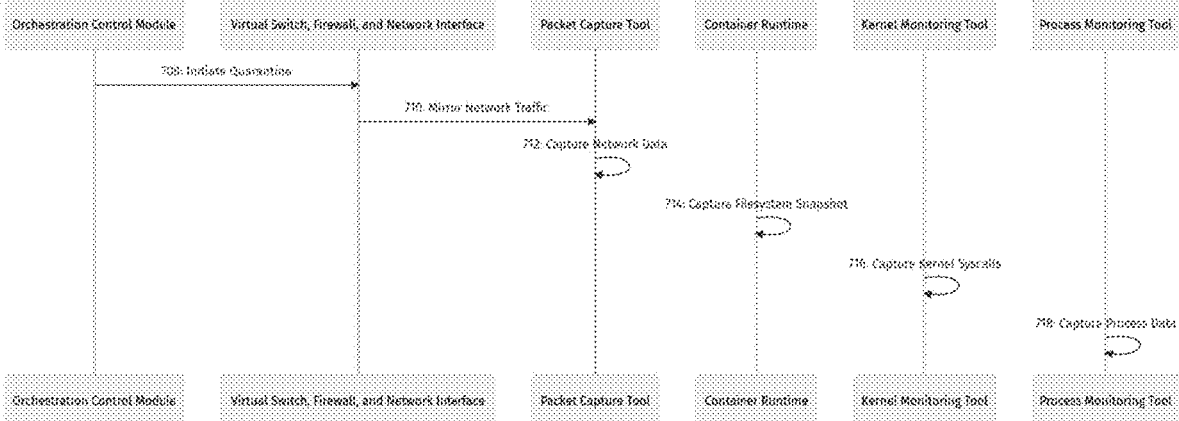
FIG. 7B: Sample Sequence Diagram - Part 2: Quarantine and Data Capture

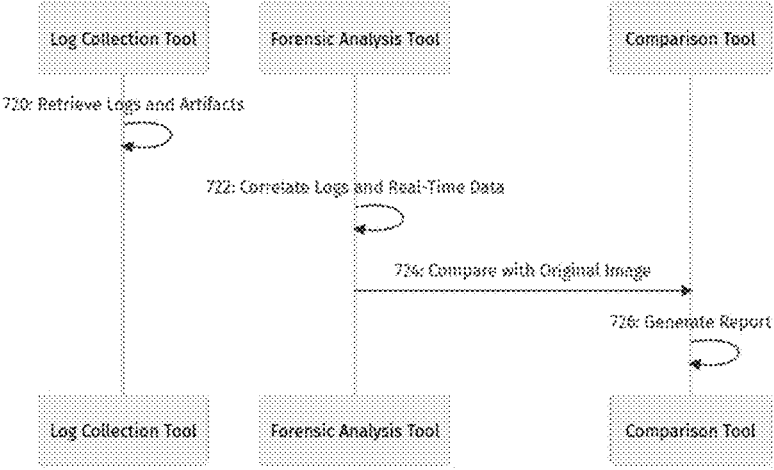
FIG. 7C: Sample Sequence Diagram - Part 3: Log Retrieval, Correlation, and Analysis
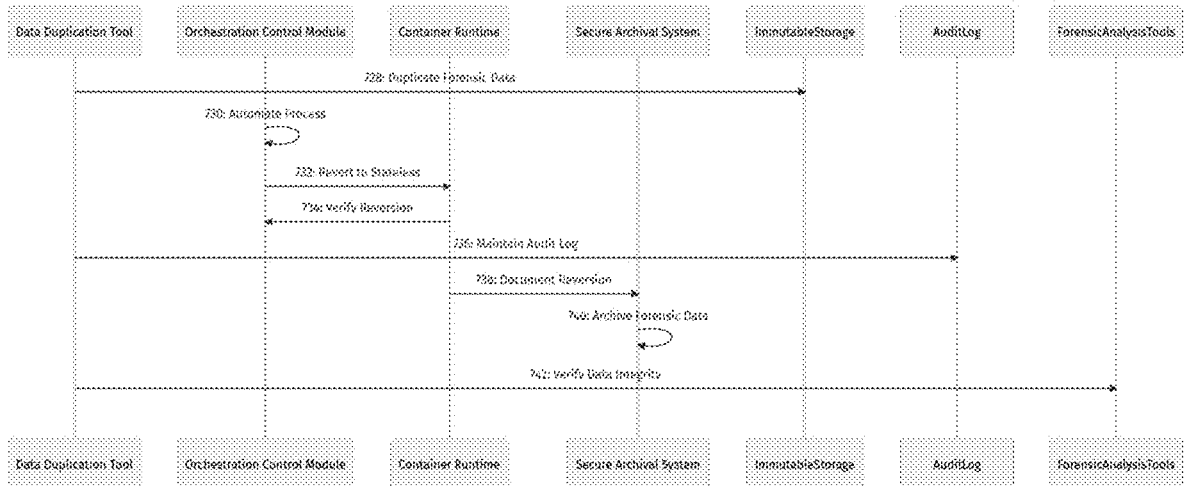
FIG. 7D: Sample Sequence Diagram - Part 4: Data Duplication, Reversion, and Archival

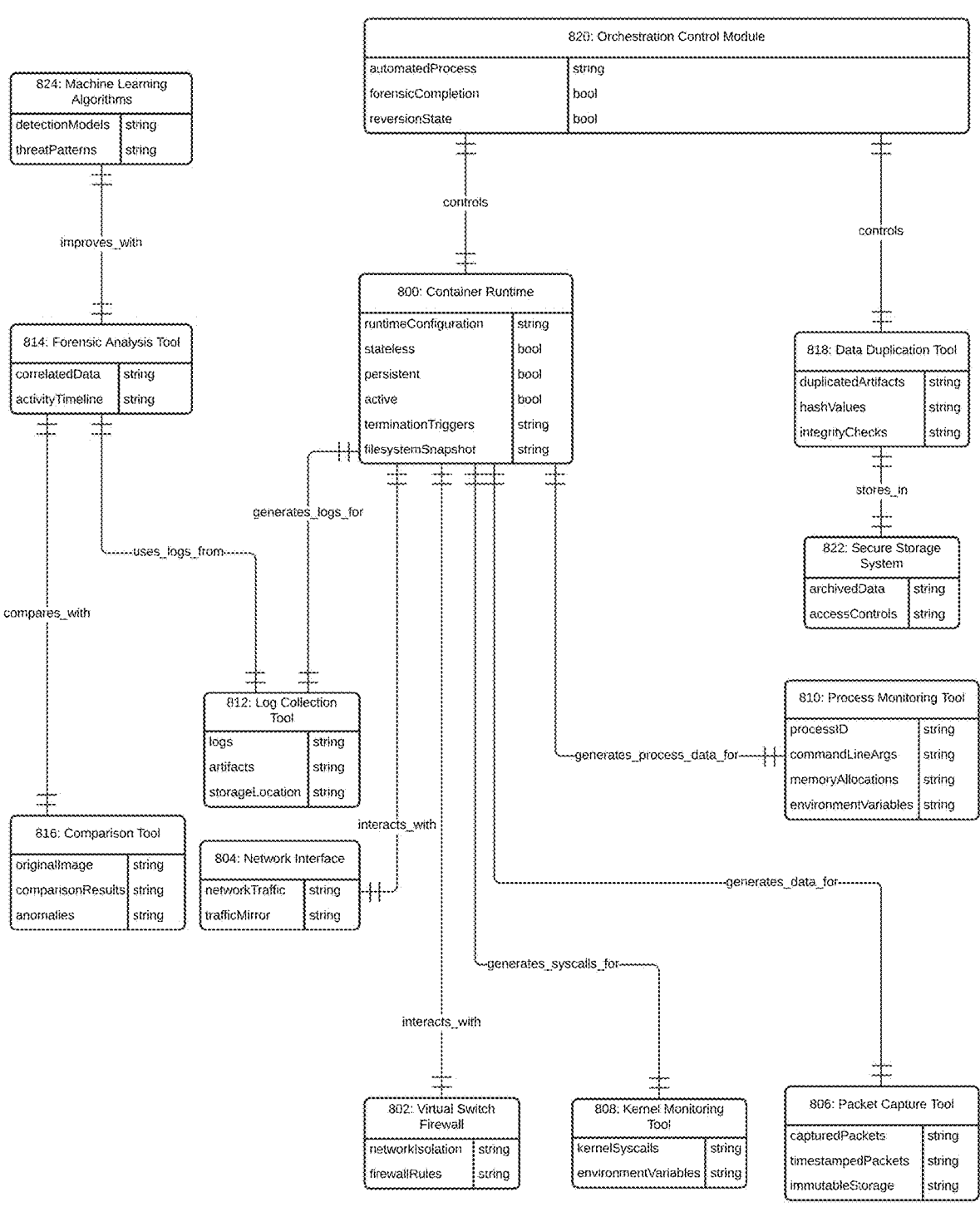
FIG. 8: Sample Entity Relationship Diagram

CONTAINERS-BASED FORENSICS FOR PERSISTENT AND STATELESS CONTAINERS

TECHNICAL FIELD

The invention(s) disclosed herein pertain to Electrical Computers and Digital Data Processing Systems: Virtual Machine Task or Process Management or Task Management/Control within digital computing environments. The inventions focus on converting and managing containerized computing instances, similar to virtual machines, by ensuring that they remain persistent during forensic investigations. They include the processes of conversion from being stateless to persistent, capturing snapshots, managing network traffic, and preserving the state of these virtualized tasks or processes within a distributed computing environment for further analysis and investigation, and then reversion from persistent back to stateless when appropriate as part of DFIR.

DESCRIPTION OF THE RELATED ART

Digital Forensics and Incident Response (DFIR) is a crucial field within cybersecurity that focuses on the investigation and resolution of security breaches, cyberattacks, and other digital threats. DFIR encompasses two main components: digital forensics, which involves the collection, preservation, and analysis of digital evidence, and incident response, which includes the steps taken to manage and mitigate the impact of security incidents. The primary goal of DFIR is to understand how a security breach occurred, determine its scope, and prevent further damage while gathering evidence that may be used in legal proceedings or to improve future security measures.

In the context of modern computing, containers have become an essential tool for deploying and managing applications in a flexible and efficient manner. A container is a lightweight, standalone executable package that includes everything needed to run a piece of software, such as the code, runtime, system tools, libraries, and settings. Containers are designed to run consistently across different computing environments, making them ideal for developers and operations teams who need to ensure that applications run reliably regardless of where they are deployed. Containers are isolated from one another, sharing the host operating system's kernel but maintaining their own distinct execution environments, which allows for the efficient use of system resources.

Containers differ from hypervisors, another technology used to create and manage isolated computing environments and require a different solution in the field of DFIR. A hypervisor is a software layer that enables the creation and management of virtual machines (VMs), which are complete operating system environments that run on top of physical hardware. Unlike containers, which share the host operating system's kernel, VMs run their own operating systems on top of the hypervisor, which abstracts the underlying hardware. This means that VMs are more resource-intensive than containers, as they require a full operating system for each instance, whereas containers only need the necessary libraries and dependencies to run the application. The key difference between containers and hypervisors lies in the level of abstraction: hypervisors abstract the hardware layer, allowing multiple operating systems to run on the same physical machine, while containers abstract the application layer, enabling multiple applications to run on the same operating system kernel.

Both containers and hypervisors present unique challenges for DFIR, particularly when it comes to capturing and analyzing forensic data. In hypervisor-based environments, the full operating system within each VM provides a comprehensive set of tools and logs for forensic analysis. However, in containerized environments, the lightweight and ephemeral nature of containers complicates the process of capturing and preserving forensic data. Containers are often designed to be short-lived, existing only as long as necessary to complete a specific task before being destroyed or replaced. This transient existence makes it extremely difficult to perform thorough forensic investigations, as critical data may be lost when containers are terminated, and is a primary benefit provided by the solutions presented in the presented inventions.

The challenges of DFIR in containerized environments are further compounded by the dynamic and distributed nature of these environments. Containers are often part of a microservices architecture, where an application is broken down into smaller, independently deployable services that communicate with each other. This architecture allows for greater scalability and flexibility, but it also means that forensic data related to a security incident may be spread across multiple containers, each running on different nodes within a distributed system. Capturing and correlating this data in a meaningful way requires a deep understanding of the interactions between containers and the ability to gather data from multiple sources in real-time.

Moreover, the automated orchestration of containers by platforms like Kubernetes introduces additional complexities. Kubernetes manages the lifecycle of containers, automatically handling tasks such as scaling, load balancing, and restarting containers as needed. While this automation enhances operational efficiency, it also creates challenges for DFIR, as containers can be automatically shut down, moved, or replaced without any manual intervention. This can lead to the loss of critical forensic evidence if the data is not captured before the container is terminated or altered.

In addition to the technical challenges, containerized environments pose legal and compliance issues that are not fully addressed by existing forensic practices. Regulatory requirements often mandate the retention of detailed logs and audit trails, but the ephemeral nature of containers can make it difficult to meet these obligations. Logs and other artifacts generated by containers may be short-lived, leading to incomplete records that could hinder forensic investigations and legal proceedings. Furthermore, the distributed nature of containers across multiple nodes and potentially multiple geographic locations complicates the maintenance of chain-of-custody, a critical aspect of ensuring the admissibility of forensic evidence in court.

Another significant issue is the lack of standardized tools and methods for conducting forensic investigations in containerized environments. While hypervisor-based environments benefit from a more mature set of tools and practices, the relative novelty of containers means that forensic investigators often have to rely on a patchwork of scripts and tools, each tailored to specific aspects of the container environment. This lack of standardization can lead to fragmented data collection, making it difficult to reconstruct a complete picture of an incident and increasing the risk of missing critical evidence.

The need for real-time data capture is particularly acute in containerized environments. Given the rapid pace at which containers are created, scaled, and destroyed, forensic investigators must be able to capture data as it is generated, rather than relying on post-incident analysis. However, the speed and scale of containerized environments present significant challenges for real-time data capture, as existing forensic tools may not be capable of keeping up with the pace of change. This can result in delays in capturing critical evidence, potentially allowing attackers to cover their tracks or complicating the forensic investigation.

The distributed nature of containerized environments also poses challenges for maintaining operational continuity during forensic investigations. In many cases, organizations cannot afford to shut down containers or pause operations while forensic data is being collected. This requirement for minimal disruption means that forensic tools must be designed to operate seamlessly within live environments, capturing data without interfering with normal operations. Achieving this balance between thorough forensic analysis and maintaining operational continuity is particularly challenging in fast-moving containerized environments.

The difficulty in establishing and maintaining a comprehensive forensic process in containerized environments highlights the long-felt and unmet need for new solutions tailored to the unique challenges of these environments. As organizations increasingly rely on containerized architectures for critical applications, the limitations of existing forensic tools and methods have become more apparent. There is a pressing need for innovative approaches to DFIR that can effectively address the complexities of containerized environments, providing organizations with the ability to conduct thorough and reliable forensic investigations while maintaining the agility and efficiency that containers offer. This need is particularly urgent as the adoption of containerized environments continues to grow, outpacing the development of forensic tools and practices that can fully support them.

SUMMARY OF THE INVENTION

The inventions (collectively, "invention") disclosed herein are directed to advanced systems and methods that revolutionize the approach to digital forensics and incident response (DFIR) within containerized environments, particularly those managed by orchestration platforms like Kubernetes. It addresses the specific challenges that arise from the ephemeral nature of containers, which are designed to be lightweight, quickly deployable, and, most importantly, transient. Containers typically operate for short periods before being terminated and replaced, a design that promotes efficiency but complicates the process of capturing and preserving forensic data. This invention introduces a comprehensive framework that allows for the meticulous capture, analysis, and preservation of forensic data in such environments without disrupting the ongoing operations or compromising the integrity of the evidence.

At the core of the invention is the ability to convert stateless containers into persistent ones, a feature critical for ensuring that a container remains operational for the duration of a forensic investigation. Containers are generally designed to be stateless, meaning they do not retain data once they are terminated. This characteristic poses a significant challenge in forensic investigations where the continuity of data is essential. The invention overcomes this by converting the container from its default stateless mode to a persistent state, thus preventing it from being automatically deleted or restarted by the container orchestration system. This conversion process is not a simple switch but a carefully orchestrated procedure that involves both the container runtime and the worker node orchestrator, ensuring that the container is safeguarded against any routine processes that might otherwise interfere with the forensic investigation.

Quarantine is another critical aspect of this invention, providing a secure and isolated environment in which the container under investigation can be analyzed without risk of contamination or interference from external sources. The invention establishes this quarantine by configuring virtual switches and applying firewall rules specifically tailored to the container environment. These measures ensure that while the container is isolated from the network, its activities can still be monitored and analyzed in real-time. This is particularly important in scenarios where the container may be part of a larger network, and there is a risk of malicious activity spreading. The quarantine process involves setting up port mirroring and, depending on the specific virtual switch or network configuration in use, such as utilizing ERSPAN ports to capture network traffic. This captured data is essential for understanding the interactions between the container and other network entities, providing a comprehensive view of the container's activities during the investigation.

A significant innovation in this system is the snapshot mechanism, which goes beyond traditional methods by capturing a read-only image of the container that includes all its layers, memory filesystems, and persistent volumes. Containers are built on a layered architecture, where each layer represents a different aspect of the container's file system and operational environment. The invention meticulously captures each of these layers in the correct sequence, from the base image to the most recent modifications. This ensures that when the snapshot is later analyzed, the entire state of the container at the time of capture can be accurately reconstructed. The snapshot also includes in-memory filesystems, which are often used to store sensitive information such as credentials and security tokens, as well as persistent volumes that may contain critical data. By capturing both volatile and non-volatile data, the invention provides a complete forensic record that is essential for a thorough investigation.

The invention's ability to capture kernel syscalls and environment variables is another core feature that significantly enhances the forensic process. Kernel syscalls are the interactions between the container and the host operating system's kernel, and they provide a detailed record of the container's actions at the system level. By capturing these syscalls, the invention allows forensic investigators to understand exactly how the container was interacting with the underlying system, including what commands were executed and what resources were accessed. Environment variables, which are used to pass configuration data and sensitive information like passwords and API keys to containers, are also captured, providing additional context that is crucial for understanding the container's behavior. The invention's ability to capture detailed process data, such as command-line arguments and memory allocations, further enhances its capability to reconstruct and analyze the container's activities with a high degree of accuracy.

In addition to these real-time data capture capabilities, the invention includes a history capture mechanism that retrieves logs and artifacts from both the current environment and any previous locations where the container may have been instantiated. Containers in a large-scale environment are often moved between different nodes as part of load balancing and scaling processes, leaving behind traces of their operations. The invention ensures that all these historical artifacts are captured, providing a complete timeline of the container's activities across its entire lifecycle. This historical data is critical for forensic investigations, as it allows investigators to trace the container's actions back to their origin, even if the container has since been redeployed or modified. The history capture process also retrieves the original container image from the artifact repository, allowing for a detailed comparison between the container's initial state and its current state. This comparison can reveal unauthorized changes or anomalies that may indicate a security breach or other malicious activity.

The invention also emphasizes the importance of preserving the integrity of forensic data through its duplication process, which involves securely copying all collected artifacts to "immutable" storage that cannot be modified. This step is crucial for ensuring that the forensic data remains unaltered and can be reliably used in legal proceedings or further analysis. Every piece of data is hashed at each stage of the process, providing a verifiable chain-of-custody that ensures the data's authenticity. The immutable storage format guarantees that the data cannot be tampered with, making it a trusted source of evidence. This rigorous approach to data preservation is essential in forensic investigations, where the integrity of the evidence is paramount.

A unique aspect of the invention is its ability to revert containers back to their original stateless state after the forensic analysis is complete (i.e., reversion back from persistent to stateless). Once the investigation has been concluded, it is crucial to return the containerized environment to its normal operational state, ensuring that the container can be deleted or restarted according to the standard lifecycle processes. The reversion process is carefully managed to remove all quarantine measures and restore the network and system configurations to their original settings. This ensures that the containerized environment can continue to operate without any residual forensic modifications that might interfere with normal operations. The ability to seamlessly revert to a pre-investigation state is critical for maintaining operational continuity, particularly in environments where uptime and availability are of the utmost importance.

The invention is designed to operate within live environments, capturing forensic data without causing disruptions. This is particularly important in containerized environments where applications are often critical to the business, and any downtime can have significant consequences. The system's ability to conduct real-time forensic investigations without impacting the performance or availability of the containerized environment makes it an invaluable tool for organizations that need to balance security with operational efficiency. The invention's real-time data capture capabilities ensure that no critical evidence is missed, even in fast-moving environments where containers are frequently deployed, scaled, and terminated.

The modular design of the invention allows it to be easily integrated with existing container management and orchestration platforms, providing a versatile solution that can be adapted to a wide range of environments. The invention is compatible with various container runtimes, storage solutions, and network configurations, making it a flexible tool that can be tailored to meet the specific needs of different organizations. Its modularity also means that specific forensic processes can be customized or extended as needed, allowing organizations to implement the system in a way that best suits their operational requirements. This adaptability is a significant advantage, particularly in environments where the technology stack may vary across different departments or applications.

The invention also incorporates artificial intelligence and/or advanced machine learning algorithms (unsupervised, supervised, or semisupervised) to analyze the collected forensic data, enabling the detection of patterns and anomalies that may indicate a security incident. These algorithms are applied to the data stored in immutable storage, allowing for automated analysis that can identify potential threats without the need for manual intervention. The use of machine learning enhances the system's ability to detect subtle indicators of compromise that might otherwise go unnoticed. This automated analysis can prioritize forensic investigations by highlighting areas of concern, enabling organizations to focus their resources on the most critical threats. The ability to combine real-time data capture with automated analysis makes the invention a powerful tool for proactive security management.

Automation is a key feature of the invention, which is designed to handle the entire forensic process, from the initial conversion of stateless containers to the final reversion back to their original state. This automation reduces the need for manual intervention, allowing forensic investigations to be conducted more quickly and efficiently. Automated workflows and triggers ensure that the forensic process is initiated as soon as a security incident is detected, minimizing the risk of data loss or contamination. This is particularly important in large-scale environments where the speed and volume of container deployments make manual forensic processes impractical. By automating the forensic process, the invention ensures that critical data is captured and preserved as soon as an incident occurs, providing a timely response that is essential for effective incident management.

Scalability is another core feature of the invention, which is designed to handle forensic investigations across thousands of containers running in distributed environments. The system's scalable architecture ensures that forensic processes can be applied consistently across all containers, regardless of their location or configuration. This is achieved through distributed data capture mechanisms that work in tandem with a centralized analysis platform, ensuring that all relevant forensic data is collected and analyzed in a timely manner. The invention's ability to scale across large environments makes it suitable for use in cloud-based and hybrid environments, where containers may be spread across multiple data centers or geographic regions. This scalability is essential for organizations that operate on a global scale, providing a consistent and reliable forensic process that can be applied across all parts of the organization.

In conclusion, the invention provides a comprehensive and innovative solution for conducting digital forensics and incident response in containerized environments. By addressing the unique challenges posed by the transient and dynamic nature of containers, the invention enables organizations to conduct thorough and reliable forensic investigations without compromising operational efficiency. Its ability to convert stateless containers to persistent ones, establish secure quarantine measures, capture detailed forensic data across all layers, and automate the entire forensic process makes it an invaluable tool for modern organizations. The system's modular design, advanced analysis capabilities, and scalable architecture ensure that it can be seamlessly integrated into a wide range of environments, providing a flexible and powerful solution for managing In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, a method performs digital forensics and incident response in a containerized environment. The method includes steps such as: converting, by a container runtime, a stateless container into a persistent container by preventing the automatic shutdown or deletion of the container by the container orchestration system, including modifying the runtime configuration to disable time-based or event-based termination triggers; quarantining, by a virtual switch and firewall, the persistent container by isolating it from the rest of the network, which includes configuring the virtual switch to reroute all traffic associated with the container to a secure, isolated network segment, and applying firewall rules to block unauthorized access to and from the container; mirroring, by a network interface, the network traffic associated with the quarantined container and capturing, by a packet capture tool, the network artifacts for forensic analysis, wherein the network interface is configured to replicate all ingress and egress packets for storage in an immutable format; capturing, by the container runtime, a snapshot of the persistent container, wherein the snapshot includes all layers of the container's filesystem, in-memory filesystems, and persistent volumes, with the snapshot process ensuring that all file handles, open connections, and active processes are preserved in their exact state at the moment of capture; capturing, by a kernel monitoring tool, kernel syscalls made by the persistent container, along with the environment variables passed to the container, including capturing syscalls related to process creation, memory allocation, and network communication to reconstruct the container's operational behavior; capturing, by a process monitoring tool, process data associated with the persistent container, including command-line arguments, environment variables, process IDs, and memory allocations, ensuring that all active and background processes are accounted for in the forensic record; retrieving, by a log collection tool, logs and artifacts associated with the persistent container from the current environment and from any previous nodes on which the container was instantiated, including the retrieval of system logs, application logs, and network logs stored in both local and remote locations; comparing, by a comparison tool, the current state of the persistent container with an original container image retrieved from an artifact repository to identify changes or anomalies, including generating a detailed report that highlights differences in file contents, configurations, and security settings; duplicating, by a data duplication tool, all collected artifacts to an immutable storage, including hashing each piece of data before and after duplication to maintain a chain-of-custody and verify data integrity at each step of the process; and reverting, by the container runtime and orchestration system, the persistent container back to a stateless state after the forensic analysis is complete, including removing all quarantine measures, restoring network and system configurations to their original settings, and verifying that the container environment is free from residual forensic data.

In some arrangements, the method comprises automating the conversion of the stateless container to a persistent container upon detection of a security incident by a security monitoring tool, including setting up automatic triggers within the security monitoring tool to initiate the conversion process without manual intervention.

In some arrangements, the method includes triggering the quarantining of the persistent container immediately following the conversion step, including activating predefined quarantine protocols that isolate the container and initiate real-time monitoring.

In some arrangements, the method further comprises configuring, by the network interface, an ERSPAN port or the like to enhance the network traffic mirroring for environments utilizing specific virtual switches, including setting up the ERSPAN session to capture and forward network traffic to a designated analysis server.

In some arrangements, the method involves capturing the snapshot by the container runtime, which includes identifying and preserving the sequence of all filesystem layers, starting from the base layer to the most recent layer, ensuring accurate reconstruction during analysis, and documenting the relationship between each layer to facilitate forensic examination.

In some arrangements, the method further comprises capturing, by the container runtime, object storage data associated with the container, in addition to the filesystem layers, memory filesystems, and persistent volumes, ensuring that all externally stored data linked to the container is included in the forensic snapshot.

In some arrangements, the method involves capturing kernel syscalls by the kernel monitoring tool, which includes capturing all syscalls related to security-sensitive operations, including file access, network connections, user authentication, and process management, to provide a comprehensive record of the container's interactions with the host system.

In some arrangements, the method includes the process monitoring tool further capturing real-time changes in the environment variables during the operation of the container, ensuring that any dynamic modifications to the container's runtime environment are recorded and preserved for analysis.

In some arrangements, the method further comprises capturing, by the process monitoring tool, the memory footprint of the container, including any temporary filesystems and cache data utilized during its operation, to provide a complete view of the container's use of system resources.

In some arrangements, the method involves the retrieval of logs and artifacts, which includes accessing logs from distributed storage nodes where the container may have previously operated, ensuring that all historical data relevant to the container's activities is collected, regardless of its current location.

In some arrangements, the method further comprises correlating, by the log collection tool, the retrieved logs with real-time data captured from the quarantined container to build a comprehensive activity timeline, including identifying patterns and sequences of events that are critical to understanding the incident.

In some arrangements, the method includes the comparison tool further identifying unauthorized or unexpected changes in the container's state by comparing the captured snapshot with predefined security policies, including generating alerts and reports that highlight any deviations from established security baselines.

In some arrangements, the method includes the comparison utilizing machine learning algorithms to detect patterns or anomalies that indicate potential security incidents, including training the algorithms on historical data to improve the accuracy of threat detection.

In some arrangements, the method involves the data duplication tool further verifying the integrity of the data in immutable storage by re-hashing the data after duplication and comparing it with the original hash values, ensuring that the data remains unchanged and tamper-proof.

In some arrangements, the method further comprises maintaining, by the data duplication tool, a detailed audit log of all operations performed during the forensic process, including timestamps, user actions, and system events, to provide a complete record of the forensic investigation.

In some arrangements, the method involves the reverting step, which includes verifying that all quarantine measures, network configurations, and system settings have been restored to their original state before resuming normal operations, ensuring that the container environment is fully reset to its pre-incident condition.

In some arrangements, the method further comprises documenting, by the container runtime, the reversion process, including the removal of forensic data and the restoration of the container to its stateless mode, providing a clear record of the steps taken to conclude the forensic investigation.

In some arrangements, the method further comprises archiving, by the system, all forensic data, logs, and audit trails in a secure, long-term storage solution for future reference or legal compliance, ensuring that the evidence is preserved for potential future investigations or legal proceedings.

In some arrangements, a method is used for conducting digital forensics and incident response in a containerized environment includes converting, by a container runtime, a stateless container into a persistent container by modifying the runtime configuration to disable all time-based, event-based, and policy-based termination triggers, ensuring the container remains active for the entire duration of the forensic investigation. The method also includes quarantining, by a virtual switch, firewall, and container orchestration system, the persistent container by isolating it from the rest of the network, which includes rerouting all container traffic through a secure, isolated network segment, and applying multi-layered firewall rules to restrict unauthorized access while maintaining access for forensic tools. The system mirrors, by a network interface and advanced packet capture tool, the network traffic associated with the quarantined container, including all ingress, egress, and internal communications, and captures these network artifacts in real-time, ensuring that all packets are stored in an immutable format for forensic analysis.

The method further includes capturing, by the container runtime, a comprehensive snapshot of the persistent container, wherein the snapshot includes all layers of the container's filesystem, in-memory filesystems, persistent volumes, object storage data, and active process states, with precise documentation of the relationships between each layer, ensuring the capture of all open file handles, active network connections, and running processes. Additionally, a kernel monitoring tool captures all kernel syscalls made by the persistent container, including those related to process creation, file access, memory management, network communication, and user authentication, along with capturing and recording the full history of environment variables passed to the container, tracking any real-time changes to these variables during the container's operation.

The method also includes capturing, by a process monitoring tool, detailed process data associated with the persistent container, including command-line arguments, process IDs, memory allocations, real-time changes to environment variables, and any interactions with temporary filesystems and cache data, providing a complete forensic record of the container's resource usage and operational behavior. Furthermore, a log collection tool retrieves all logs and artifacts associated with the persistent container, including those stored in local, remote, and distributed storage nodes, ensuring the collection of system logs, application logs, network logs, and any other relevant historical data from all nodes where the container may have previously operated.

The method further involves correlating, by a forensic analysis tool, the retrieved logs and real-time data captured from the quarantined container to construct a comprehensive and chronological activity timeline, identifying key events, patterns, and sequences of operations. A comparison tool utilizing machine learning algorithms compares the current state of the persistent container with the original container image retrieved from an artifact repository, identifying unauthorized or unexpected changes, anomalies, and deviations from predefined security policies, generating detailed reports and alerts based on these comparisons.

The method also includes duplicating, by a data duplication tool, all collected artifacts to an immutable storage solution, including hashing each piece of data before and after duplication to maintain a strict chain-of-custody, verifying data integrity, and ensuring that all forensic data remains tamper-proof and accessible for future analysis. Additionally, an orchestration control module automates the entire forensic process, from the initial conversion of the stateless container to a persistent container, through quarantine, data capture, and duplication, to the final reversion of the container back to its stateless state, ensuring consistent and timely execution of all forensic steps.

Moreover, the container runtime and orchestration system revert the persistent container back to a stateless state after the forensic analysis is complete, including the automated removal of all quarantine measures, the restoration of network configurations, system settings, and firewall rules to their original state, the verification that all forensic data, configurations, and modifications have been fully removed, and the validation that the container environment has been returned to its pre-incident condition. The data duplication tool maintains a detailed, tamper-proof audit log of all operations performed during the forensic process, including precise timestamps, user actions, system events, forensic data captured, and any deviations from standard procedures.

The method further involves documenting, by the container runtime and forensic analysis tool, the entire reversion process, including the removal of all forensic data, restoration of the container to its original stateless mode, and the secure archiving of all detailed forensic records, logs, audit trails, and documentation in a secure, long-term storage solution. Finally, a secure storage system archives all forensic data, logs, audit trails, and documentation in a secure, long-term storage solution that ensures full compliance with legal, regulatory, and industry standards for evidence preservation, providing secure access controls, encryption, and retention policies to protect the integrity of the evidence for future reference, forensic analysis, or legal proceedings, and enabling authorized personnel to securely retrieve and review archived data as needed.

In some arrangements, a system is used for conducting digital forensics and incident response in a containerized environment includes a container runtime configured to convert a stateless container into a persistent container by modifying the runtime configuration to disable all time-based, event-based, and policy-based termination triggers, ensuring the container remains active for the entire duration of the forensic investigation. The system also includes a virtual switch and firewall configured to quarantine the persistent container by isolating it from the rest of the network, which includes rerouting all container traffic through a secure, isolated network segment, applying multi-layered firewall rules that dynamically adjust to block unauthorized access based on real-time threat intelligence, and enabling secure access for authorized forensic tools and personnel while preventing any external communications that could compromise the integrity of the investigation.

Additionally, the system includes a network interface and packet capture tool configured to mirror the network traffic associated with the quarantined container, including capturing all ingress, egress, and inter-container communications, storing these network artifacts in real-time within an immutable, tamper-proof format, and ensuring that the captured packets are indexed and timestamped for accurate chronological reconstruction during forensic analysis. The container runtime is further configured to capture a comprehensive snapshot of the persistent container, wherein the snapshot includes all layers of the container's filesystem, in-memory filesystems, persistent volumes, object storage data, and active process states, with precise documentation of the hierarchical relationships and dependencies between each layer, ensuring the preservation of all file handles, active network connections, and running processes, and maintaining the state of any memory-resident data or temporary filesystems that may contain critical forensic evidence.

The system also includes a kernel monitoring tool configured to capture all kernel syscalls made by the persistent container, including syscalls related to process creation, file access, memory management, network communication, user authentication, and system-level operations, along with capturing and recording the full history of environment variables passed to the container, tracking any real-time changes to these variables during the container's operation to provide a complete and granular record of the container's interactions with the host operating system. Furthermore, the system includes a process monitoring tool configured to capture detailed process data associated with the persistent container, including command-line arguments, process IDs, memory allocations, real-time changes to environment variables, the state and behavior of all active and background processes, interactions with temporary filesystems and cache data, and any inter-process communications, providing a comprehensive forensic record that details the container's resource usage, operational behavior, and any deviations from expected norms.

The system also includes a log collection tool configured to retrieve all logs and artifacts associated with the persistent container, including those stored in local storage, remote storage, distributed storage nodes, and centralized logging systems, ensuring the collection of system logs, application logs, network logs, security logs, and any other relevant historical data from all nodes and storage locations where the container may have operated or left residual data, with capabilities to aggregate, filter, and correlate these logs for a coherent and complete forensic timeline. Additionally, a forensic analysis tool is configured to correlate the retrieved logs and real-time data captured from the quarantined container, constructing a comprehensive, chronological activity timeline that identifies key events, patterns, sequences of operations, and potential indicators of compromise, and enabling the identification and contextualization of security incidents, unauthorized activities, or anomalies within the broader operational context of the containerized environment.

Furthermore, the system includes a comparison tool utilizing advanced machine learning algorithms configured to compare the current state of the persistent container with the original container image retrieved from an artifact repository, identifying unauthorized or unexpected changes, security anomalies, deviations from predefined security policies, and any tampering or modifications to the container's filesystem, configurations, or runtime environment, generating detailed forensic reports, alerts, and recommendations based on these comparisons, and facilitating the automation of anomaly detection and threat identification. A data duplication tool is also included, which is configured to duplicate all collected artifacts to an immutable storage solution, including hashing each piece of data before and after duplication to maintain a strict and verifiable chain-of-custody, conducting continuous integrity checks during the duplication process, and ensuring that all forensic data is stored in a tamper-proof, encrypted format that is protected against unauthorized access or modification, and that complies with industry-standard forensic best practices and legal requirements for evidence preservation.

The system includes an orchestration control module configured to automate the entire forensic process, from the initial conversion of the stateless container to a persistent container, through quarantine, network traffic mirroring, data capture, and duplication, to the final reversion of the container back to its stateless state, ensuring consistent, timely, and repeatable execution of all forensic steps across multiple containers and environments, with the capability to scale the forensic process across large, distributed, or cloud-based environments, and to adapt to different container orchestration platforms and configurations. Additionally, the container runtime and orchestration system are further configured to revert the persistent container back to a stateless state after the forensic analysis is complete, including the automated removal of all quarantine measures, the restoration of network configurations, system settings, and firewall rules to their original state, the verification that all forensic data, configurations, and modifications have been fully removed, and the validation that the container environment has been returned to its pre-incident condition without any residual forensic footprints that could impact ongoing operations or future forensic investigations.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another.

However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 depicts a sample system architecture for container-based forensics for persistent and stateless containers in accordance with one or more aspects of the disclosed invention.

FIG. 2 depicts a sample flowchart of the forensic process within a containerized environment, detailing the steps from incident detection to container conversion and quarantine. The figure outlines how each step in the forensic process is carried out, including network traffic mirroring, data capture, and evidence storage.

FIG. 3 depicts a sample components diagram of the forensic system, focusing on the key elements involved in container quarantine and data capture. The figure highlights the roles of the container runtime, virtual switch, firewall, and monitoring tools in isolating and analyzing the persistent container.

FIG. 4 depicts a sample high-level process diagram of the forensic system, illustrating the overall flow from container detection to data archival. The figure shows the interaction between major components, including container conversion, network quarantine, data capture, the final storage of forensic evidence, and reversion from "persistent" back to "stateless" for a return to "business as usual."

FIG. 5 depicts a sample interaction diagram of the forensic system, showing the communication between various components during the forensic process. The figure illustrates how the container runtime, monitoring tools, and storage systems interact to ensure comprehensive data capture and secure forensic analysis.

FIG. 6 depicts a sample class diagram of the forensic system, representing the structure and relationships between different classes involved in the process. The figure outlines key classes such as the container, container runtime, and forensic tools, highlighting their attributes and methods.

FIG. 7A depicts a sample sequence diagram showing the initial steps in the forensic process, including the detection of a security incident and the conversion of a container from stateless to persistent. The figure illustrates the interaction between the security monitoring tool, orchestration control module, and container runtime during this phase.

FIG. 7B depicts a sample sequence diagram for quarantining the persistent container and capturing network traffic. The figure shows how the virtual switch, firewall, and network interface work together to isolate the container and mirror its network communications for forensic analysis.

FIG. 7C depicts a sample sequence diagram focused on the capture of forensic data, including filesystem snapshots, kernel syscalls, and process data. The figure details the coordinated actions of the container runtime, kernel monitoring tool, and process monitoring tool in collecting and preserving this critical data.

FIG. 7D depicts a sample sequence diagram illustrating the final steps of the forensic process, including the reversion of the persistent container to a stateless state and the archival of forensic data. The figure shows how the data duplication tool, orchestration control module, and secure archival system ensure the integrity and storage of the forensic evidence.

FIG. 8 depicts a sample entity relationship diagram of the forensic system, illustrating the relationships between key entities involved in the forensic process. The figure shows how components such as containers, runtime environments, and forensic tools interact and are connected through their various attributes and operations.

DETAILED DESCRIPTION

The invention pertains to comprehensive systems and methods for conducting digital forensics and incident response (DFIR0 in a containerized computing environment. It addresses the challenges associated with investigating both stateless and persistent containers by providing a robust framework that ensures data integrity, security, and thoroughness during the forensic process. The system is designed to convert stateless containers into persistent containers upon detection of a security incident, thereby preventing their automatic termination and ensuring that they remain active throughout the investigation. This conversion process involves modifying the runtime configuration to disable all time-based, event-based, and policy-based termination triggers, which is critical for preserving the container's state and making it available for forensic analysis.

Once the container has been converted to a persistent state, the system quarantines it by isolating it from the rest of the network. This is achieved through the coordinated efforts of a virtual switch, firewall, and container orchestration system, which reroute all container traffic through a secure, isolated network segment. The firewall applies multi-layered rules to restrict unauthorized access while ensuring that authorized forensic tools can still interact with the container. This quarantine process is vital for preventing the spread of any potential threats and ensuring that the container's data remains secure during the investigation.

The system also features a network interface and advanced packet capture tool that mirror the network traffic associated with the quarantined container. This includes capturing all ingress, egress, and internal communications in real-time. The captured network artifacts are stored in an immutable format, which is essential for ensuring that the data remains unchanged and tamper-proof, providing reliable evidence for forensic analysis. The ability to capture and store network traffic in this manner is a key aspect of the invention, as it allows investigators to reconstruct the events leading up to the security incident with a high degree of accuracy.

In addition to capturing network traffic, the system includes a comprehensive snapshot module that captures all layers of the container's filesystem, in-memory filesystems, persistent volumes, object storage data, and active process states. This snapshot process documents the precise relationships between each layer and ensures that all open file handles, active connections, and running processes are preserved in their exact state at the moment of capture. This level of detail is crucial for forensic investigators, as it allows them to analyze the container's state in a way that is as close to real-time as possible, providing valuable insights into the nature and extent of the security incident.

The invention also incorporates a kernel monitoring tool that captures all kernel syscalls made by the persistent container. This includes syscalls related to process creation, file access, memory management, network communication, and user authentication. The monitoring tool also captures all environment variables and their real-time changes during the container's operation. By capturing this low-level system interaction, the invention provides a granular view of the container's behavior, which is essential for detecting any unauthorized or malicious activities that may have occurred.

Process monitoring is another critical aspect of the invention. The system captures detailed process data associated with the persistent container, including command-line arguments, process IDs, memory allocations, and real-time changes to environment variables. This data provides a complete forensic record of the container's resource usage and operational behavior, which is indispensable for identifying anomalies and understanding the sequence of events that led to the security incident. The ability to capture and analyze this process data in detail is one of the core strengths of the invention.

The invention also addresses the need for comprehensive log collection and correlation. It includes a log collection tool that retrieves all logs and artifacts associated with the persistent container, including those stored in local, remote, and distributed storage nodes. This tool ensures the collection of system logs, application logs, network logs, and any other relevant historical data from all nodes where the container may have previously operated. The retrieved logs are then correlated with real-time data captured from the quarantined container to construct a comprehensive and chronological activity timeline. This timeline is critical for understanding the scope and nature of the incident, as it allows investigators to identify key events, patterns, and sequences that are indicative of unauthorized activities.

A key feature of the invention is its comparison tool, which utilizes advanced machine learning algorithms and/or artificial intelligence to compare the current state of the persistent container with the original container image retrieved from an artifact repository. This comparison process identifies any unauthorized or unexpected changes, anomalies, and deviations from predefined security policies. The tool generates detailed reports and alerts based on these comparisons, providing forensic investigators with actionable insights that are essential for responding to the incident effectively.

Data duplication and integrity verification are also central to the invention. The system includes a data duplication tool that duplicates all collected artifacts to an immutable storage solution. Each piece of data is hashed before and after duplication to maintain a strict chain-of-custody, ensuring that the data remains unchanged and tamper-proof. This immutable storage solution is critical for preserving the integrity of the forensic data, making it accessible for future analysis and legal proceedings. The ability to ensure the integrity and security of forensic data throughout the investigation is a key advantage of the invention.

Automation is another core aspect of the invention. The orchestration control module automates the entire forensic process, from the initial conversion of the stateless container to a persistent container, through quarantine, data capture, and duplication, to the final reversion of the container back to its stateless state. This automation ensures consistent and timely execution of all forensic steps, reducing the potential for human error and increasing the efficiency of the investigation. The automation capabilities of the system are particularly valuable in large-scale, distributed environments where manual intervention would be impractical.

After the forensic analysis is complete, the system reverts the persistent container back to its original stateless state. This involves removing all quarantine measures, restoring network and system configurations to their original state, and verifying that all forensic data and modifications have been fully removed. The system ensures that the container environment is returned to its pre-incident condition without any residual forensic footprints. This reversion process is critical for maintaining the operational integrity of the containerized environment and preventing any unintended side effects from the forensic investigation, as well as allowing the return to "business as usual" for the computer system as soon as possible.

The invention also maintains a detailed audit log of all operations performed during the forensic process. This log includes timestamps, user actions, system events, and the specific forensic data captured, providing a complete and verifiable record of the investigation. The audit log is essential for ensuring transparency and accountability throughout the forensic process, making it easier to identify any discrepancies or inconsistencies in the investigation.

Furthermore, the system documents the reversion process, including the removal of all forensic data, restoration of the container to its stateless mode, and archiving of the detailed forensic records, logs, and audit trails in a secure, long-term storage solution. This documentation is crucial for compliance with legal and regulatory requirements, as well as for preserving the integrity of the evidence for future reference or legal proceedings. The ability to securely archive forensic data and documentation is a key feature of the invention.

The system also includes verification tools that ensure the integrity and completeness of the forensic data stored in immutable storage. These tools re-hash the data and compare it with the original hash values to verify that the data has remained unchanged and is tamper-proof. This verification process is essential for maintaining the credibility and reliability of the forensic data, which is critical in legal contexts.

Finally, the invention leverages historical forensic data to improve the accuracy of anomaly detection. The system's AI and/or machine learning algorithms continuously update detection models based on new forensic data collected from ongoing investigations. This ability to learn from past incidents enhances the system's capacity to identify and respond to potential security incidents, making it a dynamic and evolving solution for digital forensics in containerized environments.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models-Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

The system architecture illustrated in FIG. 1 presents a meticulously designed framework tailored to address the complexities and challenges of Digital Forensics and Incident Response (DFIR) within containerized environments. These environments, particularly those managed by advanced orchestration platforms like Kubernetes, introduce unique difficulties in forensic investigations due to the transient nature of containers, which are designed to be ephemeral, lightweight, and capable of rapid deployment and termination. The architecture is built to capture, preserve, and analyze forensic data from these containers while ensuring that the operations within the containerized environment remain uninterrupted, thereby maintaining the integrity of the investigation process and the operational continuity of the system.

Central to this architecture is the conversion module, identified as 100 in the FIG., which performs the critical function of converting containers from a stateless mode to a persistent state. Stateless containers, by design, do not retain data once they are terminated, posing a significant challenge during forensic investigations where data continuity is paramount. The conversion module ensures that the container remains operational throughout the forensic investigation by preventing it from being automatically deleted or restarted by the container orchestration system. This conversion is a highly intricate process that involves not just the container runtime but also the worker node orchestrator, ensuring that routine processes, such as scheduled restarts or terminations, do not interfere with the forensic examination. The persistent state allows forensic investigators to gather comprehensive data without the risk of losing critical information due to the container's termination, effectively freezing the container's state for the duration of the investigation.

Once the container has been converted to a persistent state, the quarantine module, labeled as 102, is employed to isolate the container in a secure environment. This module creates a protected space where the container's IP address remains unchanged, and all network traffic is carefully controlled. The quarantine module achieves this by configuring virtual switches and implementing specific firewall or virtual network rules tailored to the container environment, creating a network boundary that prevents any external access unless explicitly allowed for forensic purposes. The module also mirrors the network traffic, capturing all data being transmitted to and from the container, and redirects it to artifact storage. This captured network data is crucial for understanding the container's interactions with other network entities, providing a detailed record of its network activity during the period of investigation. The quarantine environment ensures that the container is fully isolated from the rest of the network, preventing any contamination or interference from external sources, while still allowing real-time monitoring and data capture. This isolation is especially important in scenarios where the container might be part of a larger, interconnected network, and there is a risk that any malicious activity could spread to other parts of the system.

In addition to isolating the container, the system utilizes a snapshot module, labeled as 106, to create a comprehensive, read-only image of the running container including its "in use" memory. Not only do we collect the memory of the running container but also the disk. This disk snapshot is far more detailed than traditional methods, as it captures all layers of the container's file system, from the base image to the most recent modifications. Containers are typically built using a layered architecture, where each layer represents a different aspect of the container's file system and operational environment. The snapshot module meticulously captures each of these layers in the correct sequence, ensuring that the entire state of the container can be accurately reconstructed during later analysis. Furthermore, the snapshot also includes in-memory filesystems, which often store sensitive information such as credentials, security tokens, and temporary data that are not typically visible during standard operations. The module also captures persistent volumes, which are storage volumes designed to survive container restarts and are crucial for maintaining data continuity. These volumes may contain critical data that needs to be preserved for forensic analysis. Additionally, the snapshot module captures object storage data, which is frequently used by containers for storing large amounts of unstructured data. By capturing both volatile and non-volatile data, including memory, temporary file systems, persistent volumes, and object storage, the snapshot module provides a complete and thorough forensic record, essential for reconstructing the container's state at the time of capture and for conducting a detailed forensic investigation.

Complementing the snapshot module is the capture module, designated as 108, which is responsible for gathering detailed operational data from the container. This module focuses on capturing kernel syscalls, environment variables, and proc data, all of which provide deep insights into the container's behavior at the system level and startup of a container. Kernel syscalls are the interactions between the container and the host operating system's kernel, documenting the system-level actions performed by the container, such as executed commands, accessed resources, and system interactions. Capturing these syscalls allows forensic investigators to reconstruct the container's activities with high accuracy, providing a clear picture of what the container was doing at any given time. The module also captures environment variables, which are critical for understanding the container's configuration and behavior. These variables often contain sensitive information such as passwords, API keys, and configuration settings that are passed to the container at runtime. Additionally, the capture module gathers proc data, which includes metadata about the container's processes, such as command-line arguments, memory allocations, and process states. This metadata is invaluable for understanding how the container was constructed, how it operated during its lifecycle, how it started, and how it interacted with the underlying operating system and other containers.

The system further enhances the forensic investigation process through the history module, labeled as 110, which extends the investigation by retrieving logs and artifacts from both the current environment and any previous locations where the container may have operated. In large-scale environments, containers are often moved, at startup, between different nodes as part of load balancing and scaling processes, leaving behind traces of their operations. The history module ensures that all these historical artifacts, including logs and persistent volumes from previous instantiations, are captured, providing a complete timeline of the container's activities across its entire lifecycle. This historical data is crucial for forensic investigations as it allows investigators to trace the container's actions back to their origin, even if the container has since been redeployed or modified. The module also retrieves the original container image from the artifact repository, enabling a detailed comparison between the container's initial state and its current state. This comparison can reveal unauthorized changes, anomalies, or modifications that may indicate a security breach or other malicious activities. The ability to correlate historical data with the current state of the container is essential for understanding the full scope of any potential incident, providing a comprehensive view of the container's lifecycle and any changes that may have occurred over time.

In order to ensure that the collected forensic data remains unaltered and trustworthy, the system incorporates a duplication module, marked as 112, which securely copies all collected artifacts to immutable storage, labeled as 120. Immutable storage is specifically designed to be tamper-proof, ensuring that the forensic evidence remains unaltered and can be reliably used in legal proceedings or further analysis. Each piece of data collected is hashed at every stage of the process, creating a verifiable chain of custody that guarantees the authenticity and integrity of the forensic evidence. This rigorous approach to data preservation is critical in forensic investigations, where the integrity of the evidence is paramount. By ensuring that all artifacts are stored in an immutable format, the system provides a trusted and reliable source of evidence that can withstand scrutiny in legal and investigative contexts.

To further streamline the forensic process, the system includes a rule-out module, labeled as 114, which is designed to automatically identify and remove artifacts that are not relevant to the specific investigation. This module accesses content stored in the immutable storage and analyzes it to determine which artifacts are pertinent to the investigation and which are extraneous. By filtering out irrelevant artifacts, the rule-out module ensures that the forensic analysis focuses only on the data that is critical to the investigation, thereby enhancing the efficiency and accuracy of the forensic process. This automated filtering process is particularly valuable in large-scale environments where the volume of collected data can be substantial, allowing investigators to concentrate their efforts on the most important evidence.

Once the relevant data has been identified, the analysis module, labeled as 116, conducts a thorough examination of the artifacts stored in the immutable storage. This module is responsible for performing detailed forensic analysis to identify patterns, anomalies, or indicators of compromise that may suggest a security incident or malicious activity. The analysis may involve advanced techniques, including machine learning algorithms, to detect subtle signs of compromise that might otherwise go unnoticed. These algorithms can analyze the collected data to identify potential threats, prioritize forensic investigations, and provide actionable insights to investigators. By automating the analysis process, the system ensures that no critical evidence is overlooked, even in fast-moving environments where containers are frequently deployed, scaled, and terminated. The analysis module is a key component of the system, enabling organizations to quickly and accurately identify and respond to security threats.

Finally, after the forensic investigation has been completed, the system employs a reversion module, labeled as 118, to return the container to its original stateless state. This reversion process is carefully managed to remove all quarantine measures, restore the network and system configurations to their original settings, and ensure that the containerized environment can return to normal operations without any residual modifications that might interfere with its regular lifecycle. The ability to seamlessly revert to a pre-investigation state is crucial for maintaining operational continuity, particularly in environments where uptime and availability are of utmost importance. The reversion module ensures that the forensic investigation does not disrupt the ongoing operations of the containerized environment, allowing the business to resume normal activities as quickly as possible. This process is essential for maintaining the balance between conducting a thorough forensic investigation and ensuring that the containerized environment continues to function efficiently.

The entire system is designed with modularity and scalability in mind, allowing it to be easily integrated with existing container management and orchestration platforms. This modular design provides a versatile and adaptable solution that can be tailored to meet the specific needs of different organizations and environments. The system's scalable architecture enables it to handle forensic investigations across thousands of containers, distributed across multiple nodes, data centers, or geographic regions. This scalability is particularly important for organizations operating on a global scale, where consistent and reliable forensic processes are essential for maintaining security and compliance across all parts of the organization.

In conclusion, the system architecture depicted in FIG. 1 offers a sophisticated, comprehensive, and highly detailed approach to managing digital forensics and incident response in containerized environments. Each module within the system plays a critical role in capturing, preserving, and analyzing forensic data, ensuring that investigations can be conducted effectively without disrupting ongoing operations. The system's modular design, advanced analysis capabilities, and scalable architecture make it a powerful and flexible tool for organizations that rely on containerized architectures, providing a robust solution for managing forensic investigations in modern, complex computing environments.

FIG. 2 illustrates an in-depth flowchart detailing the forensic process applied within a containerized environment, which is particularly designed to handle the unique challenges posed by both persistent and stateless containers. The process begins at step 200, where a security monitoring tool detects a potential security incident within the containerized infrastructure. This detection serves as the trigger for a comprehensive forensic process aimed at capturing, preserving, and analyzing critical data to understand the incident's nature, scope, and potential impact.

Upon detecting the security incident, the process proceeds to step 202, where the system initiates the conversion of the affected container from its default stateless mode to a persistent state. In a typical containerized environment, stateless containers are designed to be ephemeral, meaning they do not retain data once they are terminated. This characteristic, while beneficial for resource management and scalability, poses a significant challenge for forensic investigations, as it could lead to the loss of crucial evidence. To address this, the conversion process involves modifying the runtime configuration of the container to disable any time-based, event-based, or policy-based termination triggers that could otherwise result in the container's automatic shutdown or deletion. By converting the container to a persistent state, the system ensures that the container remains operational and fully accessible throughout the forensic investigation, thus preserving all relevant data.

Following the conversion, the container is subjected to quarantine in step 204. This quarantine process is meticulously designed to isolate the container from the rest of the network, thereby preventing any further potential threats from spreading and ensuring that the container's activities can be monitored in a controlled environment. The quarantine is implemented by rerouting all traffic associated with the container through a virtual switch, which acts as an intermediary between the container and the network. Additionally, firewall rules are applied to further isolate the container, blocking unauthorized access while still allowing forensic tools and authorized personnel to interact with the container as needed. This dual-layered approach ensures that the container is securely isolated, preventing any external interference that could compromise the integrity of the forensic data.

In step 206, the system mirrors the network traffic associated with the quarantined container. This mirrored traffic is an exact copy of all ingress and egress communications that the container engages in and is forwarded to a packet capture tool designed to store this data in an immutable format. The packet capture tool plays a crucial role in forensic investigations by providing a detailed record of the container's network interactions, allowing investigators to reconstruct the sequence of events leading up to the security incident. The immutability of the stored network traffic ensures that the data remains unaltered, preserving its evidentiary value for legal proceedings or further analysis.

Next, at step 208, the system captures a comprehensive filesystem snapshot of the persistent container. This snapshot is far more detailed than a standard filesystem capture, as it includes all layers of the container's filesystem, in-memory filesystems, and any persistent volumes that the container might be utilizing. The snapshot process is meticulously designed to ensure that all open file handles, active network connections, and running processes are captured in their exact state at the moment of capture. This level of detail is essential for forensic analysis, as it allows investigators to reconstruct the container's state at the time of the incident, providing valuable insights into how the container was operating and what data it was handling.

The forensic process continues with step 210, where the system captures all kernel syscalls made by the persistent container. Kernel syscalls are the low-level interactions between the container and the host operating system's kernel, and they provide a detailed record of the container's actions at the system level. This includes critical operations such as process creation, memory management, file access, and network communication. By capturing these syscalls, the system enables forensic investigators to gain a granular understanding of how the container was interacting with the underlying system, including any potentially unauthorized or malicious actions that may have been performed.

In step 212, the system captures detailed process data associated with the persistent container. This data includes command-line arguments, process IDs, memory allocations, and environment variables, which collectively provide a comprehensive record of the container's resource usage and operational behavior. The inclusion of environment variables is particularly important, as these variables often contain sensitive information such as passwords, API keys, and other configuration data that could be crucial for understanding the container's activities. The system also tracks real-time changes to these variables, ensuring that any modifications made during the container's operation are captured and preserved for analysis. This detailed process data is indispensable for identifying anomalies or unauthorized activities, as it allows investigators to reconstruct the exact sequence of actions that took place within the container.

The forensic process then moves to step 214, where the system retrieves and aggregates logs and artifacts from both the current environment and any previous environments where the container may have operated. This step is critical for constructing a complete timeline of the container's activities, as containers in a distributed environment are often moved between different nodes as part of load balancing or scaling processes. The log collection tool is designed to retrieve a wide range of logs, including system logs, application logs, network logs, and any other relevant historical data. By aggregating these logs, the system ensures that no piece of potentially valuable information is overlooked, providing investigators with a comprehensive view of the container's lifecycle and its interactions across the distributed environment.

Once all relevant data has been captured, the system proceeds to step 216, where it compares the current state of the persistent container with the original container image stored in an artifact repository. This comparison is typically enhanced by advanced AI and/or machine learning algorithms that are trained to detect unauthorized changes, anomalies, and deviations from predefined security policies. The comparison process is a critical component of the forensic investigation, as it helps to identify any discrepancies between the container's current state and its expected configuration. These discrepancies could indicate the presence of malware, unauthorized access, or other forms of tampering that may have contributed to the security incident. The system generates detailed reports and alerts based on the findings of this comparison, providing forensic investigators with actionable insights that are essential for responding to the incident effectively.

To ensure the long-term integrity and availability of the forensic data, step 218 involves duplicating all collected artifacts to an immutable storage solution. This storage solution is designed to prevent any tampering or alteration of the data, preserving its evidentiary value for legal proceedings or further analysis. Each piece of data is hashed before and after duplication to maintain a strict chain-of-custody, ensuring that the data remains unchanged throughout the entire forensic process. The use of immutable storage is a key feature of the system, as it provides a secure and reliable repository for all forensic evidence, which is critical for maintaining the integrity of the investigation.

After the forensic analysis is complete, the system initiates step 222, where the persistent container is reverted back to its original stateless state. This reversion process involves carefully removing all quarantine measures and restoring the container's network and system configurations to their pre-incident settings. The system ensures that all forensic data and modifications made during the investigation are fully removed, allowing the containerized environment to return to normal operation without any residual forensic footprints. This step is crucial for maintaining the operational integrity of the environment, especially in systems where uptime and availability are critical.

Finally, in step 224, all forensic data is securely archived for future reference or legal compliance. The archived data includes not only the forensic artifacts collected during the investigation but also detailed logs of the forensic process itself, including timestamps, user actions, and system events. This comprehensive archival process ensures that a complete and verifiable record of the investigation is preserved, which is essential for potential future investigations, audits, or legal proceedings. The secure archival of forensic data is a fundamental aspect of the system, as it provides a long-term, tamper-proof repository that can be accessed by authorized personnel as needed.

In summary, FIG. 2 outlines a highly detailed and methodical approach to conducting digital forensics in a containerized environment, addressing the unique challenges posed by the transient and distributed nature of containers. The example process ensures that all critical data is meticulously captured, preserved, and analyzed with the highest degree of integrity, enabling organizations to respond effectively to security incidents while maintaining the operational stability of their containerized environments.

FIG. 3 offers an intricate view of various components and sample interactions within the forensic system designed for containerized environments, emphasizing the critical processes required to convert, manage, and analyze containers during a forensic investigation. The diagram is structured to visually convey the sequential and interconnected roles of various components, each of which plays a vital part in ensuring that forensic data is accurately captured, preserved, and analyzed to maintain the integrity of the investigation.

The process begins with the Container Runtime, denoted by reference number 300, which is at the center of converting a stateless container, labeled as 301, into a persistent container, marked as 306. In the context of a containerized environment, stateless containers are typically designed to be ephemeral, meaning they are created, used for a specific task, and then destroyed without retaining any data. This ephemeral nature, while efficient for resource management, presents a significant challenge when it comes to forensic investigations, as the automatic termination of a stateless container would result in the loss of potentially crucial evidence. The role of the Container Runtime is to intervene in this lifecycle by modifying the container's runtime configuration through the Container Runtime Interface, designated as 302. This modification involves the activation of the Persistence Configuration Module, represented by 304, which alters the container's settings to disable any automatic termination triggers, such as those based on time or specific events. By converting the container into a persistent state, the system ensures that the container remains active and accessible for the duration of the forensic investigation, thereby preserving all relevant data that might otherwise be lost.

Once the container is successfully converted to a persistent state, the system proceeds to implement quarantine measures to secure the container and prevent it from interacting with the broader network, thereby mitigating any potential risks. This is depicted in the diagram by the configuration involving the Firewall and Virtual Switch, collectively shown by reference number 307. The persistent container, now labeled as 308, is connected to a Virtual Switch, identified as 310. The Virtual Switch is a critical component that reroutes all network traffic associated with the container to a Quarantine Network Segment, marked as 312. The Quarantine Network Segment is a dedicated and isolated portion of the network where the container can be safely analyzed without risking the spread of any malicious activities or further compromising the network. The firewall, depicted as 314, works in conjunction with the Virtual Switch to enforce strict security controls, blocking unauthorized access to and from the container while allowing access for authorized forensic tools and personnel. This quarantine process is essential for ensuring that the container's data remains secure and uncontaminated during the forensic investigation, thereby preserving the integrity of the evidence.

Following the establishment of quarantine, the forensic process advances to the data capture phase, which is critical for preserving a detailed and accurate record of the container's state at the time of the incident. This phase is initiated with the Snapshot Capture Process, represented by reference number 317, which involves capturing a comprehensive snapshot of the persistent container, again labeled as 318. The snapshot captures all Filesystem Layers, shown as 320, which include every layer of the container's filesystem from the base image to the most recent modifications. This detailed capture is facilitated by the Filesystem Snapshot Module, identified as 322, which ensures that all aspects of the filesystem are preserved, including in-memory filesystems and persistent volumes. The importance of capturing these filesystem layers cannot be overstated, as they provide a complete and accurate record of the container's state, including all open file handles, active network connections, and running processes at the moment of capture. This level of detail is indispensable for forensic investigators who need to reconstruct the container's activities and understand the sequence of events leading up to the security incident.

In addition to capturing the filesystem, the system also employs a Kernel Monitoring Tool, labeled as 324, to record all kernel syscalls made by the persistent container. Kernel syscalls are the low-level interactions between the container and the host operating system's kernel, encompassing critical operations such as process creation, memory management, file access, and network communication. By capturing these syscalls, the system provides forensic investigators with a granular view of the container's behavior at the system level, allowing them to identify any unauthorized or anomalous actions that may have occurred. This detailed monitoring is crucial for understanding how the container interacted with the underlying system and for identifying any potential security breaches or other malicious activities.

Complementing the kernel monitoring is the Process Monitoring Tool, marked as 326, which captures detailed process data associated with the persistent container. This tool records a wide range of process-related information, including command-line arguments, process IDs, memory allocations, and environment variables. Environment variables are particularly important in this context, as they often contain sensitive information such as configuration settings, API keys, and passwords, which could be pivotal in understanding the container's behavior. The Process Monitoring Tool also tracks real-time changes to these environment variables, ensuring that any modifications made during the container's operation are captured and preserved for analysis. This comprehensive process data provides forensic investigators with a complete record of the container's resource usage and operational behavior, which is critical for identifying anomalies, tracing the sequence of events, and understanding the full impact of the security incident.

All of the data captured during the snapshot and monitoring processes is then securely stored in a dedicated storage system, represented by Snapshot Data Storage, labeled as 328. This storage solution is designed to maintain the forensic data in an immutable format, ensuring that it remains tamper-proof and accessible for further analysis or legal proceedings. The immutability of the stored data is a key feature of the system, as it guarantees that the evidence is preserved in its original state, free from any alterations or tampering that could compromise its integrity. This secure storage is essential for maintaining the credibility of the forensic investigation and for ensuring that the data can be reliably used as evidence in any legal or regulatory contexts.

In summary, FIG. 3 provides an in-depth depiction of sample components involved in an exemplary forensic process for containerized environments, highlighting the critical steps of converting a stateless container into a persistent one, quarantining the container to ensure its isolation, capturing comprehensive forensic data through snapshots, kernel monitoring, and process monitoring. Each component in the diagram plays a vital role in ensuring that the forensic investigation is thorough, accurate, and capable of withstanding legal scrutiny. The diagram illustrates a sample approach to manage and analyze containers in a forensic context, ensuring that all relevant data is captured, preserved, and analyzed with the highest degree of integrity. This detailed approach allows responding effectively to security incidents and for maintaining the operational stability and security of containerized environments.

FIG. 4 presents a sample high-level process diagram that meticulously outlines the exemplary steps involved in conducting a forensic investigation within a containerized environment. This diagram serves as a comprehensive guide, detailing the sequential actions required to convert, quarantine, capture, analyze, and eventually restore containers, particularly focusing on those that are stateless by default but are converted to persistent states for the purpose of forensic investigation. Each step in this sample process is designed to ensure that every aspect of the container's operation and state is thoroughly documented and preserved, thereby upholding the integrity of the forensic investigation and enabling a complete understanding of the security incident.

The process begins with the conversion step, labeled as 400, where the system converts a stateless container into a persistent container. Stateless containers are typically designed to be temporary, created for specific tasks, and terminated once their function is complete, without retaining any state data. This characteristic, while efficient for resource management, poses significant challenges in forensic investigations, as the termination of a stateless container would result in the loss of potentially critical forensic data. To address this, the system modifies the container's runtime configuration to disable automatic termination triggers, whether they are based on time, events, or policies. By converting the container into a persistent state, the system ensures that the container remains operational, and its data preserved for the entire duration of the forensic investigation. This conversion is crucial, as it allows investigators to access and analyze the container's data without the risk of it being lost due to the container's termination.

Following the conversion to a persistent state, the process advances to the quarantine step, designated as 402. Quarantining the container is a critical security measure designed to isolate the container from the broader network, thereby preventing any potential threats from spreading and ensuring that the container's data is protected from external tampering or interference. The quarantine process involves rerouting all traffic associated with the container through a virtual switch, which directs the traffic to a secure and isolated network segment known as the quarantine network segment. Additionally, firewall rules are applied to strictly control access to the container, allowing only authorized forensic tools and personnel to interact with it. This isolation is vital for maintaining the security and integrity of the forensic data, as it prevents unauthorized access and ensures that the container's environment is fully controlled during the investigation.

In step 404, the system captures a comprehensive snapshot of the container's filesystem. This snapshot includes all layers of the container's filesystem, encompassing both in-memory filesystems and any persistent volumes that the container might be using. The snapshot process is meticulously designed to preserve the container's state at the exact moment of capture, including all active processes, open file handles, and network connections. This detailed snapshot is essential for forensic investigators, as it provides a complete and accurate record of the container's state, allowing them to reconstruct its operations and understand the sequence of events that led up to the security incident. The ability to capture and preserve such a detailed state is crucial for identifying any unauthorized actions or changes that may have occurred within the container.

In addition to the filesystem snapshot, the process also includes step 406, where a screenshot of the container's current state is taken. This step captures a visual representation of the container's state at the time of the investigation, including any user interfaces or application outputs that were active. The screenshot provides additional context that complements the data captured in the filesystem snapshot, offering investigators a clearer understanding of what was occurring within the container at the time of the incident. This visual data can be particularly valuable in identifying anomalies or unusual activities that might not be immediately apparent from the filesystem data alone.

The next phase of the process, step 408, involves capturing various forms of data associated with the container, including kernel syscalls, process data, and network traffic. Capturing kernel syscalls is crucial because these low-level system calls represent the direct interactions between the container and the host operating system's kernel. These syscalls provide detailed insights into the container's behavior at the system level, including operations such as process creation, memory management, file access, and network communication. This level of detail is indispensable for understanding how the container was interacting with the underlying system and for identifying any unauthorized or malicious actions. The process data captured during this step includes command-line arguments, environment variables, process IDs, and other relevant information that helps reconstruct the container's operations. Environment variables, in particular, often contain sensitive configuration data that can be critical for understanding the container's behavior. Finally, the capture of network traffic is essential for understanding the container's interactions with other network entities, enabling forensic investigators to trace communication patterns and identify any suspicious or unauthorized activities. The combination of these data captures ensures that the forensic investigation has a comprehensive view of the container's activities from multiple perspectives.

Step 410 involves the aggregation of historical data related to the container. Containers in distributed environments often move between different nodes as part of load balancing or scaling operations. To ensure a thorough investigation, the system retrieves logs, artifacts, and other historical data from both the current environment and any previous environments where the container may have operated. This step is crucial for constructing a complete and chronological timeline of the container's activities, providing forensic investigators with a full picture of the container's lifecycle and interactions. The aggregation of this historical data ensures that no relevant information is overlooked, and that the investigation is as comprehensive as possible.

Following the aggregation of historical data, step 412 involves duplicating all captured data to immutable storage. The use of immutable storage is a cornerstone of the forensic process, as it ensures that the captured data remains tamper-proof and unchanged throughout the investigation. Each piece of data can be hashed before and after duplication to maintain a strict chain-of-custody, ensuring that the integrity of the data is preserved and that it can be reliably used as evidence in legal proceedings or further analysis. The immutability of the storage solution guarantees that the forensic data is secure from any unauthorized modifications, preserving its evidentiary value.

Step 414, labeled as "Rule-Out," involves the careful process of ruling out potential false positives or benign activities that may have been captured during the investigation. This step is critical for focusing the forensic analysis on actual threats or anomalies, ensuring that the investigation is both accurate and efficient. By systematically eliminating non-threatening data, investigators can concentrate on the activities that are truly indicative of a security incident, thereby streamlining the analysis process.

The analysis phase, represented by step 416, is where the forensic data is thoroughly examined to identify any anomalies, unauthorized changes, or malicious activities. This analysis involves a detailed examination of the snapshots, screenshots, syscalls, process data, and network traffic that have been captured throughout the investigation. Advanced analysis tools, including those enhanced by machine learning algorithms, are employed to detect patterns, deviations from normal behavior, and other indicators of compromise. The goal of this analysis is to understand the nature and scope of the security incident, identify the root cause, and assess the impact on the containerized environment. The insights gained from this analysis are crucial for developing an effective response to the incident and for improving the security of the environment in the future.

After the forensic analysis is complete, the system proceeds to step 418, where the container is reverted back to its original stateless state. This reversion process is carefully managed to ensure that all quarantine measures are removed, and that the container's network and system configurations are restored to their pre-incident settings. The system also ensures that all forensic data and modifications made during the investigation are fully removed, allowing the containerized environment to return to normal operation without any residual forensic footprints. This step is essential for maintaining the operational integrity of the environment, particularly in systems where uptime and availability are critical.

Finally, the diagram references an ongoing or ad-hoc data gathering process, indicated as step 420. This process involves the continuous or scheduled collection of additional data, such as packet captures or historical netflow data, which is stored in immutable storage. This ongoing data gathering is essential for maintaining a comprehensive record of network activity and for supporting the forensic investigation with additional contextual information. By continuously gathering data, the system ensures that it is prepared to respond to new incidents as they arise, providing a proactive approach to maintaining security and ensuring the integrity of the containerized environment.

In conclusion, FIG. 4 outlines a sample of a detailed and systematic process for conducting a forensic investigation in a containerized environment. Each step in the process is meticulously designed to ensure that all relevant data is captured, preserved, and analyzed with the highest degree of accuracy, enabling a thorough understanding of the security incident and supporting effective incident response. This comprehensive approach ensures that the forensic investigation is conducted with the utmost integrity, preserving the security and stability of the containerized environment and providing a reliable basis for any legal or regulatory actions that may follow.

FIG. 5 provides an example of an in-depth interaction diagram that visually delineates the intricate and interconnected processes involved in conducting a forensic investigation within a containerized environment. The diagram captures the sequence of interactions and data flows between various components, each playing a crucial role in responding to a detected security incident, ensuring the capture and preservation of forensic evidence, and ultimately restoring the containerized environment to its pre-incident state. The interaction diagram underscores the sophistication and complexity required to maintain the integrity of the forensic process in environments characterized by ephemeral and distributed containerized applications.

The forensic process is initiated by the Security Monitoring Tool, labeled as 500, which is responsible for continuously surveilling the containerized environment for any indicators of a security incident. Upon detecting such an incident, this tool promptly signals the Orchestration Control Module, denoted as 502, to commence the forensic process. The Orchestration Control Module functions as the central coordinator, orchestrating the sequence of steps required to thoroughly investigate the incident. It ensures that each component is activated at the appropriate time and that the forensic process proceeds in a systematic and orderly manner.

The first action taken by the Orchestration Control Module is to interact with the Stateless Container, indicated as 504. In typical operations, stateless containers are designed to perform specific tasks and then terminate without retaining any data. However, during a forensic investigation, preserving the container's state is imperative to ensure that all relevant data is accessible for analysis. To achieve this, the Orchestration Control Module engages the Container Runtime, identified as 506, which then works with the Persistence Configuration Module, marked as 508. The Persistence Configuration Module is tasked with altering the container's runtime configuration to disable any automatic termination triggers, such as those based on time, events, or resource constraints. This action converts the stateless container into a Persistent Container, designated as 510. By converting the container into a persistent state, the system ensures that the container remains active and its data intact throughout the entire duration of the forensic investigation, thereby preventing any loss of potentially critical evidence.

Once the container is converted to a persistent state, it is then quarantined to prevent the spread of any threats and to protect the container's data from external tampering or unauthorized access. The quarantine process is managed through interactions with the Virtual Switch, labeled as 512, and the Firewall, marked as 514. The Virtual Switch reroutes all network traffic associated with the container to a Quarantine Network Segment, indicated as 518, which is a securely isolated portion of the network. This isolation ensures that the container cannot communicate with other network entities outside the quarantine, effectively containing any potential threats within a controlled environment. The Firewall plays a critical role in enforcing access controls, allowing only authorized forensic tools and personnel to interact with the container. This secure isolation is crucial for maintaining the integrity of the forensic investigation by preventing any external interference that could compromise the data.

The system then proceeds to capture essential data related to the quarantined container. This begins with the Network Interface, shown as 516, which mirrors the network traffic associated with the container and forwards it to the Packet Capture Tool, labeled as 520. The Packet Capture Tool is designed to capture all network traffic in real-time and store it in a secure, immutable format. This captured network traffic is vital for forensic investigators, as it provides detailed insights into the container's communications with other network entities, enabling the tracing of communication patterns and the identification of any suspicious or unauthorized activities. The immutability of the captured data ensures that it remains unaltered, preserving its integrity as evidence.

In conjunction with network traffic capture, the system initiates a comprehensive snapshot process to document the state of the container at the time of the incident. The Filesystem Snapshot Module, denoted as 522, captures all layers of the container's filesystem, including in-memory filesystems and persistent volumes. This detailed snapshot preserves the state of the container at a specific point in time, encompassing all active processes, open file handles, and network connections. This level of detail is essential for reconstructing the container's operations and understanding the sequence of events that led to the security incident. By capturing the entire filesystem, forensic investigators can analyze the container's state in great depth, identifying any unauthorized changes or anomalies.

Simultaneously, the Kernel Monitoring Tool, marked as 524, records all kernel syscalls made by the persistent container. Kernel syscalls represent the low-level interactions between the container and the host operating system's kernel, such as process creation, memory allocation, file access, and network communication. Capturing these syscalls provides a granular view of the container's behavior at the system level, allowing forensic investigators to understand how the container interacted with the underlying system and to identify any potentially malicious activities. The detailed syscall data is indispensable for a thorough forensic analysis, as it reveals the internal workings of the container during the incident.

Complementing the kernel monitoring is the Process Monitoring Tool, indicated as 526, which captures detailed process data, including command-line arguments, process IDs, memory allocations, and environment variables. Environment variables are particularly significant in this context, as they often contain sensitive information such as configuration settings, passwords, and API keys. By capturing this data, the Process Monitoring Tool provides a complete record of the container's resource usage and operational behavior, enabling forensic investigators to reconstruct the exact actions taken by the container and to identify any deviations from normal operations.

The forensic process also involves the aggregation of historical data associated with the container, managed by the Log Collection Tool, labeled as 528. This tool retrieves logs, artifacts, and other historical data from both the current environment and any previous environments where the container may have operated. The collected data is stored in the Artifact Repository, marked as 530, which serves as a secure repository for all relevant forensic artifacts. Aggregating this historical data is critical for constructing a comprehensive and chronological timeline of the container's activities, providing a full picture of the container's lifecycle and interactions across the distributed environment. This timeline is essential for understanding the broader context of the security incident and for identifying patterns or sequences of events that may have contributed to the incident.

After the data capture phase, the system utilizes the Comparison Tool, indicated as 534, to compare the current state of the persistent container with its original state as recorded in the artifact repository. This comparison process is enhanced by advanced machine learning algorithms that are trained to detect unauthorized changes, anomalies, and deviations from predefined security policies. The Comparison Tool generates detailed reports based on its findings, which are then compiled into a comprehensive Forensic Report, labeled as 536. This report provides forensic investigators with actionable insights, enabling them to understand the nature and scope of the security incident, identify the root cause, and assess the impact on the containerized environment. The report serves as a crucial document for guiding the incident response and for informing any subsequent legal or regulatory actions.

To ensure the long-term integrity and availability of the forensic data, the system employs a Data Duplication Tool, marked as 538, which duplicates all captured data to Immutable Storage, labeled as 542. Immutable storage is a key feature of the forensic process, as it ensures that the captured data remains tamper-proof and unchanged throughout the investigation. Each piece of data is hashed before and after duplication to maintain a strict chain-of-custody, ensuring that the evidence remains intact and can be reliably used in legal proceedings or further analysis. The immutability of the storage solution guarantees that the forensic data is secure from any unauthorized modifications, preserving its evidentiary value.

After the forensic analysis is complete, the system activates the Reversion Module, indicated as 544, to revert the persistent container back to its original stateless state. This step involves carefully removing all quarantine measures and restoring the container's network and system configurations to their pre-incident settings. The Reversion Module ensures that all forensic data and modifications made during the investigation are fully removed, allowing the containerized environment to return to normal operation without any residual forensic footprints. This reversion process is critical for maintaining the operational integrity of the environment, particularly in systems where uptime and availability are critical to business continuity.

Throughout the entire forensic process, the system maintains a detailed record of all actions and interactions using the Audit Log System, marked as 546. This system logs every action taken during the investigation, including timestamps, user actions, and system events. The Audit Log provides a complete and verifiable record of the forensic process, which is essential for ensuring transparency and accountability. The audit log is a crucial reference for any subsequent reviews, audits, or legal proceedings, providing a detailed account of the forensic investigation and the steps taken to address the security incident.

In conclusion, FIG. 5 meticulously illustrates an example of the complex interactions and processes potentially involved in conducting a forensic investigation within a containerized environment. Each component plays a vital role in ensuring that forensic data is accurately captured, preserved, and analyzed, enabling a thorough understanding of the security incident and supporting an effective incident response. The diagram highlights the precision and coordination required to manage the forensic process in environments characterized by the transient and distributed nature of containers. It ensures that all relevant data is preserved with the highest degree of integrity, and that the containerized environment can be restored to its original state without compromising operational stability or security.

FIG. 6 provides a sample of a class diagram that intricately outlines various potential classes and their relationships within the system designed to conduct forensic investigations in containerized environments. This diagram is fundamental for understanding the architecture of the forensic process, as it delineates the attributes, methods, and interactions of each class involved in the system. The relationships between these classes ensure a coordinated and systematic approach to preserving, capturing, and analyzing forensic data, thereby maintaining the integrity of the forensic investigation and enabling effective incident response in environments characterized by both persistent and stateless containers.

At the core of the diagram is the Container class, labeled as 600, which represents the basic unit being investigated in the containerized environment. This class contains several attributes, including 'containerID', 'state', 'networkConfig', and 'runtimeConfig'. These attributes are crucial for identifying the container, tracking its current state (whether stateless or persistent), and managing its network and runtime configurations. The Container class also defines key methods such as 'convertToPersistent( )', 'revertToStateless( )', and 'applyQuarantine( )'. These methods are essential for transitioning the container between states, applying quarantine measures, and ensuring that the container's data is preserved during the forensic investigation.

The ContainerRuntime class, designated as 602, plays a pivotal role in managing the lifecycle of the container. This class includes attributes such as 'runtimeID', 'configModule', and 'orchestrationModule', which are critical for managing the container's runtime environment and coordinating with the orchestration control mechanisms. The methods defined within this class, including 'convertContainer(containerID)', 'manageContainerLifecycle(containerID)', and 'triggerReversion(containerID)', are responsible for initiating the conversion of a stateless container to a persistent state, managing the container throughout its lifecycle, and triggering the reversion process once the forensic investigation is complete. The ContainerRuntime class ensures that the container's state is appropriately managed and that the forensic process is integrated seamlessly into the container's lifecycle.

To ensure the security and isolation of the container during the forensic process, the QuarantineNetwork class, labeled as 604, is employed. This class contains attributes such as 'networkSegmentID', 'firewallRules', and 'trafficMirroringEnabled', which are vital for configuring the quarantine network segment, applying firewall rules, and enabling traffic mirroring. The methods within this class, including 'isolateContainer(containerID)', 'applyFirewallRules(containerID)', and 'mirrorTraffic(containerID)', are essential for isolating the container from the broader network, enforcing strict security measures, and capturing all network traffic associated with the quarantined container. The QuarantineNetwork class plays a crucial role in maintaining the integrity of the forensic data by preventing unauthorized access and ensuring that the container's environment is fully controlled during the investigation.

The ForensicDataCapture class, marked as 606, is central to the process of capturing and preserving the data associated with the container. This class includes attributes such as 'snapshotID', 'syscallData', and 'processData', which store the identifiers and data related to the filesystem snapshots, kernel syscalls, and process activities, respectively. The methods in this class, such as defined 'monitorSyscalls(containerID)', 'captureFilesystem(containerID)', and 'captureProcessData(containerID)', are responsible for capturing a detailed snapshot of the container's filesystem, monitoring its interactions with the host operating system, and documenting the processes running within the container. The ForensicDataCapture class ensures that all critical data is meticulously recorded and preserved for analysis.

The LogCollection class, indicated as 608, is tasked with aggregating and storing logs from various sources within the containerized environment. This class includes attributes like 'logID', 'logSource', and 'timestamp', which are essential for identifying the logs, their origins, and the time of capture. The methods within this class, such as 'retrieveLogs(containerID)', 'aggregateLogs(logID)', and 'storeLogs(logID)', enable the retrieval, aggregation, and storage of logs related to the container. The LogCollection class plays a vital role in constructing a complete timeline of the container's activities by ensuring that all relevant logs are collected and stored securely.

The ArtifactRepository class, labeled as 610, serves as the secure storage location for all artifacts related to the forensic investigation. This class contains attributes such as 'artifactID', 'originalImage', and 'forensicData', which store the identifiers, original container images, and captured forensic data, respectively. The methods defined within this class, including 'storeArtifact(artifactID)', 'retrieveArtifact(artifactID)', and 'compareWithCurrent(containerID, artifactID)', are responsible for storing, retrieving, and comparing forensic artifacts with the current state of the container. The ArtifactRepository class is crucial for maintaining a secure and organized repository of forensic data, which is essential for both the investigation and any subsequent legal proceedings.

To ensure the long-term integrity and availability of the forensic data, the DataDuplication class, marked as 612, is employed. This class includes attributes such as 'duplicationID', 'hashValue', and 'storageLocation', which are used to track the duplication process, verify the integrity of the data through hashing, and manage the storage locations. The methods within this class, such as 'duplicateData(forensicData)', 'verifyIntegrity(hashValue)', and 'storeInImmutableStorage(duplicationID)', are responsible for duplicating the captured data, verifying its integrity, and storing it in an immutable storage solution. The DataDuplication class ensures that the forensic data remains secure and tamper-proof throughout the investigation.

The ImmutableStorage class, designated as 614, represents the final, secure storage location for all duplicated forensic data. This class contains attributes like 'storageID', 'dataStored', and 'securityLevel', which are crucial for managing the storage of data and applying appropriate security measures. The methods defined within this class, including 'storeData(duplicationID)', 'retrieveData(storageID)', and 'applySecurityPolicies(storageID)', are responsible for securely storing the forensic data, enabling its retrieval when needed, and enforcing security policies to protect the data from unauthorized access. The ImmutableStorage class is a cornerstone of the forensic process, ensuring that all data is preserved in a secure and unalterable state The ComparisonTool class, labeled as 616, is essential for analyzing the captured forensic data. This class includes attributes such as 'comparisonID', 'anomaliesDetected', and 'mlModel', which are used to manage the comparison process, track detected anomalies, and apply machine learning models for advanced analysis. The methods within this class, such as 'compareData(currentData, storedData), runAnomalyDetection(mlModel)', and 'generateComparisonReport(comparisonID)', enable the comparison of current and stored data, the detection of anomalies, and the generation of detailed forensic reports. The ComparisonTool class plays a critical role in identifying unauthorized changes or deviations from normal behavior, providing valuable insights for the forensic investigation.

The OrchestrationControl class, marked as 618, is responsible for coordinating the various tasks and components involved in the forensic process. This class includes attributes like 'controlID', 'tasksManaged', and 'automationLevel', which are essential for managing the orchestration of tasks and determining the level of automation applied. The within class, such methods this as 'initiateForensicProcess (containerID)', 'coordinateComponentTasks(controlID)', and 'completeForensicCycle(containerID)', are responsible for initiating the forensic process, coordinating the tasks of different components, and ensuring the completion of the forensic investigation. The OrchestrationControl class ensures that the entire forensic process is executed in a coordinated and efficient manner.

Finally, the ReversionModule class, labeled as 620, handles the reversion of the container back to its original stateless state after the forensic investigation is complete. This class includes attributes such as 'reversionID', 'originalState', and 'quarantineMeasuresRemoved', which are crucial for tracking the reversion process and ensuring that all quarantine measures are removed. The methods within this class, including 'revertContainer(containerID)', 'restoreNetworkConfig(containerID)', and 'validateReversion(reversionID)', are responsible for reverting the container, restoring its original network configuration, and validating the reversion process. The ReversionModule class is essential for ensuring that the containerized environment is returned to its normal state without any residual effects from the forensic investigation.

In conclusion, FIG. 6 offers an exemplary systematic overview of the classes involved in the forensic process within a containerized environment. Each class is meticulously designed to perform specific functions, from capturing and storing forensic data to analyzing and comparing it, ensuring that the forensic investigation is thorough, accurate, and capable of withstanding legal scrutiny. The relationships and interactions between these classes underscore the complexity and precision required to manage the forensic process in environments characterized by the transient and distributed nature of containers, ensuring that all relevant data is preserved with the highest degree of integrity and that the containerized environment can be restored to its original state after the investigation is complete.

FIGS. 7A, 7B, 7C, and 7D present a series of sequence diagrams that collectively illustrate the comprehensive and detailed process of conducting a forensic investigation within a containerized environment. These diagrams break down the process into four distinct parts: incident detection and container conversion, quarantine and data capture, log retrieval, correlation and analysis, and finally, data duplication, reversion, and archival. Each diagram meticulously details the interactions between different components within the system, showing the precise order and flow of operations that ensure a thorough and secure forensic investigation, with each step crucially designed to maintain the integrity of the forensic data and the overall system.

FIG. 7A begins the forensic process by focusing on the critical initial steps of incident detection and container conversion, which is vital for preserving the container's state for the investigation. The sequence starts with the Security Monitoring Tool continuously monitoring the containerized environment for any potential security incidents. Upon detecting an anomaly or a suspicious event, the Security Monitoring Tool immediately signals the Orchestration Control Module to initiate the forensic process. The Orchestration Control Module is a central component responsible for coordinating the entire forensic procedure. It interacts with the Container Runtime to identify the specific stateless container involved in the incident. This interaction is crucial as it determines which container needs to be preserved for further analysis. Moving forward, the Container Runtime invokes the Persistence Configuration Module, instructing it to modify the container's runtime settings. This modification involves converting the stateless container into a persistent container. The conversion to a persistent state is critical because it ensures that the container's state is maintained and preserved throughout the forensic investigation. Without this conversion, the container could terminate and lose all data, which would be detrimental to the investigation. This step effectively locks the container's state, preventing any automatic termination that might otherwise occur in a stateless container environment.

FIG. 7B continues the process by detailing the necessary steps for quarantine and data capture, ensuring that the container is isolated, and that all relevant data is captured for forensic analysis. After the container has been successfully converted to a persistent state, the Orchestration Control Module directs the Quarantine Network to isolate the container from the rest of the environment. This step is critical to ensure that the container does not interact with other systems or spread any potential threats. The Quarantine Network configures the Virtual Switch to reroute all network traffic associated with the container to a secure, isolated network segment. This rerouting is further reinforced by configuring the Firewall to apply strict security rules, effectively sealing off the container from unauthorized access. With the container now securely quarantined, the forensic data capture phase begins. The Orchestration Control Module activates the Forensic Data Capture module, which is responsible for several critical tasks. First, the module captures a detailed snapshot of the container's filesystem, ensuring that all layers, including in-memory filesystems and persistent volumes, are preserved. This snapshot is essential for reconstructing the container's state and understanding its operations at the time of the incident. Following the filesystem capture, the Forensic Data Capture module monitors kernel syscalls, recording all low-level interactions between the container and the host operating system. These syscalls are crucial for understanding the container's behavior and identifying any unauthorized actions. Simultaneously, the module captures detailed process data, including command-line arguments, process IDs, and environment variables, providing a comprehensive view of the container's activities. In parallel with these operations, the Packet Capture Tool mirrors the network traffic associated with the quarantined container, storing it securely in a format that prevents any tampering. This captured network traffic is vital for understanding the container's communications and interactions within the network, enabling forensic investigators to trace any suspicious activities or data flows.

FIG. 7C shifts the focus to the retrieval, correlation, and analysis of logs, which are integral for building a comprehensive understanding of the incident and identifying any patterns or anomalies. The process begins with the Log Collection Tool being activated to retrieve logs from various sources related to the container. These logs may include system logs, application logs, and network logs, all of which provide valuable insights into the container's activities before, during, and after the incident. The retrieved logs are aggregated into a cohesive dataset, ensuring that all relevant information is gathered in one place for easier analysis. The aggregated logs are then securely stored, preserving them for further investigation. To enhance the analysis, the system uses the Artifact Repository to compare the current logs and captured data with previous forensic artifacts stored in the repository. This comparison is crucial for identifying discrepancies, unauthorized changes, or anomalies that might indicate a security breach or malicious activity. The Comparison Tool plays a significant role by employing advanced machine learning models to detect patterns and deviations from expected behavior. These models are trained to recognize subtle indicators of compromise that might be missed in a manual review. The results of these comparisons are compiled into detailed forensic reports. These reports provide a comprehensive analysis of the incident, offering insights into the nature and scope of the breach, the methods used by the attackers, and the potential impact on the containerized environment. The forensic reports are essential for guiding the response to the incident and for informing any necessary remediation efforts.

Finally, FIG. 7D illustrates the concluding steps of the forensic investigation, focusing on data duplication, reversion, and archival, which are crucial for preserving the integrity of the investigation and restoring the system to its normal state. After the forensic analysis is complete, the system activates the Data Duplication Tool. This tool duplicates all the captured and analyzed data, ensuring that it is securely stored in Immutable Storage. The tool verifies the integrity of the duplicated data by generating and comparing hash values, ensuring that the data has not been altered during the duplication process. The data is then securely stored in Immutable Storage, which is critical for maintaining the data's integrity over time, particularly if it needs to be referenced in legal proceedings or future investigations. With the forensic data securely stored, the Orchestration Control Module initiates the reversion process. The Reversion Module is triggered to revert the container back to its original stateless state, which involves restoring the container's network and runtime configurations to their pre-incident settings. This process is carefully managed to ensure that all quarantine measures are removed and that the containerized environment can return to normal operation without any residual effects from the forensic investigation. The system validates the reversion, ensuring that the container has been fully restored and that all forensic processes have been completed. Finally, the system securely archives all forensic data, logs, and reports, preserving them for future reference or legal compliance. This archival step ensures that a complete record of the forensic investigation is maintained, which is essential for any potential audits, reviews, or legal proceedings that may arise in the future.

Together, FIGS. 7A, 7B, 7C, and 7D provide a comprehensive view of a sample forensic process within a containerized environment. Each sequence diagram highlights the precise order of operations, the interactions between different system components, and the critical steps required to ensure that all relevant data is captured, preserved, analyzed, and securely stored. The diagrams illustrate the complexity and precision required to conduct forensic investigations in environments characterized by the transient and distributed nature of containers, ensuring that the process is both thorough and reliable, ultimately maintaining the security and integrity of the containerized environment while enabling effective incident response and recovery.

FIG. 8 illustrates an entity-relationship diagram that provides an in-depth view of the interactions and dependencies among various components within a sample forensic system designed specifically for containerized environments. This diagram is integral to understanding how different entities within the system collaborate to ensure the accurate capture, preservation, and analysis of forensic data, which is critical for maintaining the integrity of the forensic investigation and enabling a comprehensive response to security incidents.

At the center of this diagram is the Container Runtime, denoted as 800. The Container Runtime is the core entity responsible for managing the operational state of containers within the system. This entity is associated with several critical attributes, including 'runtimeConfiguration', which defines the specific settings and parameters that govern the container's operation; 'stateless', which indicates whether the container is in its default ephemeral state; and 'persistent', which reflects whether the container has been converted to a state that allows for the retention of data beyond its normal lifecycle. The 'active' attribute shows whether the container is currently running, while 'terminationTriggers' lists the conditions under which the container might be terminated, such as resource limits or time constraints. The 'filesystemSnapshot' attribute is particularly important, as it stores the state of the container's filesystem at a particular moment, capturing all the data, processes, and configurations present at that time. The Container Runtime is a pivotal component that interacts with various other entities to ensure that the container's state is effectively managed and preserved throughout the forensic investigation. This management is crucial because the integrity of the data depends on the container's ability to maintain its state without being prematurely terminated or altered.

Interacting closely with the Container Runtime is the Virtual Switch and Firewall, identified as 802. This entity is crucial for implementing network isolation and security measures that protect the containerized environment. The 'networkIsolation' attribute specifies how the container is isolated from the broader network, which is essential for preventing the spread of potential threats and for ensuring that the container operates within a controlled environment. The 'firewallRules' attribute defines the specific security policies that regulate what network traffic is allowed to interact with the container. By applying these rules, the Virtual Switch and Firewall enforce strict security boundaries, ensuring that only authorized communications occur and that any unauthorized access attempts are blocked. This interaction with the Container Runtime is vital for maintaining a secure environment where forensic data can be captured without interference or contamination.

The Network Interface, labeled as 804, plays a critical role in managing the flow of network traffic to and from the container. This entity is associated with attributes such as 'networkTraffic', which monitors the data packets being transmitted, and 'trafficMirror', which duplicates the network traffic for analysis purposes. The ability to mirror traffic is essential for forensic investigations, as it allows investigators to capture a complete record of all network interactions involving the container, providing insights into potential communication with external threats or unauthorized entities. The Network Interface works in concert with the Virtual Switch and Firewall to ensure that all relevant network traffic is accurately captured and directed to the appropriate tools for further examination.

One of the key tools for analyzing network traffic is the Packet Capture Tool, designated as 806. This entity is responsible for capturing and storing network packets as they pass through the system. It includes attributes like 'capturedPackets', which stores the raw data packets, and 'timestampedPackets', which records the exact time each packet was captured. This timestamping is crucial for establishing a timeline of events, enabling investigators to correlate network activity with other system events. The 'immutableStorage' attribute ensures that these captured packets are stored in a manner that prevents any alteration, thereby preserving their integrity for future forensic analysis. The Packet Capture Tool is indispensable for understanding the sequence of network interactions and for identifying any anomalies or suspicious activities that may have occurred.

In addition to monitoring network traffic, the system must also capture and analyze interactions at the system level, which is the role of the Kernel Monitoring Tool, labeled as 808. This entity is tasked with monitoring the low-level operations of the container, particularly the kernel syscalls, which are the fundamental interactions between the container and the underlying operating system. The 'kernelSyscalls' attribute records these interactions, providing a detailed account of how the container is using system resources. The 'environmentVariables' attribute captures the environmental settings that can influence the container's behavior, such as configuration settings and system paths. By monitoring these syscalls and environment variables, the Kernel Monitoring Tool helps investigators understand how the container operates within the system and identify any deviations from normal behavior that could indicate a compromise.

Similarly, the Process Monitoring Tool, identified as 810, focuses on capturing detailed information about the processes running within the container. This entity is associated with attributes such as 'processID', which uniquely identifies each running process; 'commandLineArgs', which records the specific commands used to initiate these processes; and 'memoryAllocations', which tracks the amount of system memory each process is using. The 'environmentVariables' attribute is also present here, providing context for the processes' operations. The Process Monitoring Tool is vital for reconstructing the container's operational behavior and for detecting any unauthorized or unexpected processes that might have been executed during the security incident. By capturing this detailed process data, the system can analyze the container's activities with a high degree of granularity, making it easier to identify potential threats or misconfigurations.

Another crucial component of the forensic system is the Log Collection Tool, labeled as 812. This entity is responsible for gathering logs from various sources within the containerized environment. The attributes 'logs' and 'artifacts' store the actual log entries and associated forensic artifacts, while 'storageLocation' specifies where these logs are stored for future reference. The Log Collection Tool ensures that all relevant logs are collected and securely stored, providing a comprehensive record of the container's activities. These logs are indispensable for building a timeline of events and for identifying any patterns or anomalies that may have occurred during the incident. The collected logs serve as a foundational element for subsequent analysis, as they provide a detailed account of the container's interactions with other systems and entities Once the logs and other data have been collected, the system uses the Forensic Analysis Tool, identified as 814, to synthesize and analyze the captured information. This entity includes attributes like 'correlatedData', which organizes the data from various sources into a coherent structure, and 'activityTimeline', which provides a chronological view of the container's activities. The Forensic Analysis Tool is central to the investigative process, as it allows investigators to correlate different types of data-such as network traffic, process information, and system logs-into a unified timeline that can reveal the sequence of events leading up to and following the incident. This tool is essential for identifying the root cause of the incident and for understanding the full scope of its impact on the containerized environment.

The Comparison Tool, labeled as 816, is another critical component that plays a significant role in the forensic investigation. This entity is responsible for comparing the current state of the container with previous snapshots or baseline configurations. The 'originalImage' attribute stores the reference image of the container before the incident occurred, while 'comparisonResults' and 'anomalies' store the outcomes of the comparison, highlighting any differences or irregularities. The Comparison Tool uses these attributes to identify unauthorized changes, such as modifications to files, processes, or configurations, that could indicate a security breach. This tool is particularly valuable for detecting subtle deviations from normal operations that might otherwise go unnoticed.

To ensure that all forensic data is preserved and protected, the system includes the Data Duplication Tool, designated as 818. This entity is responsible for creating secure copies of all captured data. The attributes 'duplicatedArtifacts', 'hashValues', and 'integrityChecks' are used to manage the duplication process, verify the integrity of the data, and ensure that it remains consistent across all copies. The Data Duplication Tool is critical for maintaining the chain of custody, as it ensures that the forensic evidence is reliable and that it can be duplicated without any risk of tampering or data loss. This tool guarantees that multiple copies of the data are available for analysis, archiving, or legal proceedings, thereby safeguarding the integrity of the investigation.

The Orchestration Control Module, labeled as 820, oversees the entire forensic process, coordinating the activities of all other entities within the system. This entity includes attributes such as 'automatedProcess', which manages the automated aspects of the forensic workflow; 'forensicCompletion', which tracks the progress and completion of the investigation; and 'reversionState', which manages the container's state once the investigation is concluded. The Orchestration Control Module ensures that each step of the forensic process is executed in the correct sequence and that all components work together harmoniously. This coordination is vital for maintaining the efficiency and effectiveness of the forensic investigation, ensuring that no critical steps are missed and that the investigation is completed in a timely manner.

The Secure Storage System, identified as 822, provides a secure repository for all forensic data and artifacts. This entity includes attributes such as 'archivedData', which stores the forensic artifacts for long-term preservation, and 'accessControls', which manage the security measures that protect the stored data from unauthorized access. The Secure Storage System is essential for preserving the integrity and confidentiality of the forensic data, ensuring that it is available for future reference or legal proceedings. The storage system is designed to maintain the data in a secure, unalterable state, preventing any tampering or data breaches that could compromise the investigation.

Finally, the Machine Learning Algorithms (including AI if desired), designated as 824, enhance the forensic analysis by applying advanced detection models to the captured data. This entity includes attributes like 'detectionModels', which are used to identify patterns of malicious activity, and 'threatPatterns', which provide a reference for detecting known threats. The Machine Learning Algorithms interact with the Forensic Analysis Tool and the Comparison Tool to improve the accuracy and depth of the analysis, enabling the system to detect even the most subtle indicators of compromise. These algorithms are essential for identifying emerging threats and for providing investigators with sophisticated insights that can guide the response to the incident.

In summary, FIG. 8 offers an expansive and detailed depiction of the relationships and interactions between the various entities involved in an example forensic process within a containerized environment. Each entity is meticulously designed to perform specific functions that contribute to the overall success of the forensic investigation, from capturing and storing data to analyzing and comparing it. The diagram highlights the complexity and interdependence of the components within the system, illustrating the careful coordination required to maintain the integrity of the forensic investigation and to respond effectively to security incidents in environments characterized by the transient and distributed nature of containers.

Pseudocode examples to implement one or more aspects of the invention can be understood as follows to encapsulate the intricate processes of container state management, data capture, analysis, comparison, duplication, and storage, as well as the orchestration of these processes. The pseudocode can be structured to reflect the interactions between the different entities, ensuring that each component operates in harmony to maintain the integrity of the forensic investigation.

The first part of the pseudocode focuses on the Container Runtime entity, which is responsible for managing the state of the container. The pseudocode begins by checking the current state of the container to determine whether it is stateless or persistent. If the container is stateless, the system triggers the conversion process. The pseudocode for this could be represented as;

```
function manageContainerState(containerID):
    containerState=getState(containerID)
    if containerState=="stateless":
        convertToPersistent (containerID)
        applyQuarantine (containerID)
    elif containerState=="persistent":
        maintainState(containerID)
```

This pseudocode first retrieves the current state of the container using the getState(containerID) function. If the container is in a stateless state, it triggers the convertToPersistent (containerID) function to modify the runtime configuration, thereby preserving the container's data. Once the container is persistent, the system applies quarantine measures by calling the applyQuarantine (containerID) function. If the container is already persistent, the maintainState (containerID) function ensures that the container remains in its preserved state without unintended modifications.

Following this, the Virtual Switch and Firewall entity must ensure the container is isolated within a secure network segment. The pseudocode for managing the network isolation could be represented as;

```
function applyQuarantine (containerID):
    networkSegmentID=createQuarantineSegment (containerID)
    applyFirewallRules (containerID, networkSegmentID)
    enableTrafficMirroring (containerID, networkSegmentID)
```

In this pseudocode, the system creates a secure network segment using createQuarantineSegment (containerID) and applies the necessary firewall rules to enforce network isolation through applyFirewallRules (containerID, networkSegmentID). Additionally, it enables traffic mirroring with enableTrafficMirroring (containerID, networkSegmentID) to capture all incoming and outgoing traffic related to the quarantined container.

Next, the pseudocode for the Forensic Data Capture module will ensure that all relevant data is captured during the investigation. This involves capturing the filesystem snapshot, monitoring kernel syscalls, and capturing process data;

```
function captureForensicData(containerID):
    filesystemSnapshot=captureFilesystem (containerID)
    syscallData=monitorSyscalls (containerID)
    processData=captureProcessData(containerID)
    storeCapturedData(filesystemSnapshot, syscallData, processData)
```

Here, the captureFilesystem (containerID) function creates a snapshot of the container's filesystem, preserving its current state. The monitorSyscalls (containerID) function records all kernel syscalls, providing insights into how the container interacts with the host operating system. The captureProcessData(containerID) function captures detailed information about the processes running within the container. All this data is then stored securely using the storeCapturedData(filesystemSnapshot, syscallData, processData) function.

To aggregate and store logs, the Log Collection Tool pseudocode will retrieve and aggregate logs from various sources;

```
function collectLogs(containerID):
    logs=retrieveLogs(containerID)
    aggregatedLogs=aggregateLogs(logs)
    storeLogs(aggregatedLogs, storageLocation)
```

The retrieveLogs(containerID) function collects logs from all relevant sources, while aggregateLogs(logs) consolidates this data into a coherent format. The aggregated logs are then securely stored using storeLogs(aggregatedLogs, storageLocation) for future analysis.

Once data and logs are captured, the Forensic Analysis Tool processes this data to build an activity timeline and correlate different data points:

```
function analyzeForensicData(containerID):
    correlatedData=correlateData(filesystemSnapshot, syscallData, processData, aggregatedLogs)
    activityTimeline=buildTimeline(correlatedData)
    generateForensicReport (activityTimeline, correlatedData)
```

The correlateData( ) function takes the various forms of captured data and correlates them to identify connections between different events. The buildTimeline(correlatedData) function creates a chronological timeline of the container's activities, which is then used to generate a forensic report through generateForensicReport (activityTimeline, correlatedData).

For the Comparison Tool, the pseudocode will compare the current state of the container with previous snapshots or baseline images;

```
function compareContainerState(containerID):
    currentData=getCurrentState(containerID)
    originalImage=retrieveOriginalImage(containerID)
    comparisonResults=compareData(currentData, originalImage)
    anomalies=detectAnomalies(comparisonResults)
    storeComparisonResults(comparisonResults, anomalies)
```

The getCurrentState(containerID) function retrieves the container's current data, while retrieveOriginalImage(containerID) fetches the baseline or original snapshot. These are compared using compareData(currentData, originalImage), and any anomalies are detected with detectAnomalies (comparisonResults). The results are securely stored through storeComparisonResults (comparisonResults, anomalies).

The Data Duplication Tool ensures that all forensic data is duplicated and verified;

```
function duplicateAndVerifyData(containerID):
    duplicatedArtifacts=duplicateData(filesystemSnap-
        shot, syscallData, processData, aggregatedLogs)
    hashValues=generateHash(duplicatedArtifacts)
    verifyDataIntegrity(duplicatedArtifacts, hashValues)
    storeInImmutableStorage(duplicatedArtifacts)
```

The duplicateData( ) function creates secure copies of all forensic data, and generateHash( ) generates hash values to verify integrity. The verifyDataIntegrity( ) function checks that the duplicated data matches the original, ensuring no tampering has occurred. The data is then stored in immutable storage with storeInImmutableStorage( ).

The Orchestration Control Module coordinates all these processes, ensuring that each step is executed in sequence;

```
function orchestrateForensicProcess(containerID):
    initiateForensicProcess (containerID)
    captureForensicData(containerID)
    collectLogs(containerID)
    analyzeForensicData(containerID)
    compareContainerState(containerID)
    duplicateAndVerifyData(containerID)
    revertContainerToStateless(containerID)
    archiveForensicData(containerID)
```

This pseudocode shows the entire forensic process flow, starting with initiateForensicProcess (containerID) and continuing through data capture, log collection, analysis, comparison, duplication, and archival. Finally, the container is reverted to its original state using revertContainerToStateless (containerID), and all forensic data is securely archived with archiveForensicData(containerID).

The Secure Storage System manages the archival and access control of forensic data;

```
function archiveForensicData(containerID):
    archivedData=storeInSecureStorage(duplicatedArti-
        facts, comparisonResults, anomalies)
    applyAccessControls(archivedData)
```

The storeInSecureStorage( ) function ensures that all forensic data is securely stored, while applyAccessControls ( ) restricts access to authorized personnel only, maintaining the confidentiality and integrity of the archived data.

Lastly, Machine Learning Algorithms are applied to enhance the forensic analysis;

```
function applyMachineLearning(containerID):
    detectionModels=loadDetectionModels( )
    analyzedData=retrieveAnalyzedData(containerID)
    threatPatterns=detectThreatPatterns(detectionModels,
        analyzedData)
    improveForensicProcess(threatPatterns)
```

The loadDetectionModels( ) function loads pre-trained machine learning models, and detectThreatPatterns( ) applies these models to the analyzed data to identify potential threats. The results are used to improve the forensic process, ensuring that the system continuously evolves to detect new and emerging threats.

This pseudocode provides a sample overview of how each component in the forensic system can operate and interact with others to ensure the thorough and secure processing of forensic data. Each function is designed to handle specific tasks, ensuring that the forensic investigation is executed with precision, maintaining data integrity and enabling an effective response to security incidents within containerized environments. Thereafter reversion back from persistent to stateless can be performed for a return to business as usual.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Various alternative embodiments, improvements, modifications, and changes can be made to the invention as described, all of which are considered to be within the sphere and scope of the disclosure. These alternatives and enhancements allow the invention to be adapted to a wide range of environments and use cases, ensuring its applicability across different industries and technological contexts.

One alternative embodiment involves the use of different container orchestration platforms beyond the one initially described. While the current system may be designed with a specific platform in mind, such as Kubernetes, the underlying principles of the invention can be applied to other platforms, such as Docker Swarm, Apache Mesos, or proprietary container management systems. This adaptation would involve modifications to the Orchestration Control Module to interface with the APIs and runtime environments of these alternative platforms, ensuring that the forensic processes can be seamlessly integrated regardless of the container orchestration system in use.

Another modification could involve the enhancement of the AI and/or machine learning algorithms used in the forensic analysis. While the current implementation can utilize pre-trained models to detect threats and anomalies, additional embodiments can incorporate adaptive learning techniques that allow the system to evolve over time. This can be supervised or semi-supervised, for example, and would enable the machine learning algorithms (with appropriate monitoring and control) to update themselves based on new data and emerging threat patterns, making the forensic system more resilient and capable of detecting sophisticated attacks that might not have been previously encountered. Additionally, the use of federated learning can be utilized, allowing multiple systems to share insights and improvements without directly sharing sensitive data, thereby enhancing the overall effectiveness of the forensic system across a distributed network.

The storage mechanisms for forensic data can also be modified to incorporate more advanced cryptographic techniques. While the current system may use standard encryption and hashing methods, an alternative embodiment can implement homomorphic encryption, which allows computations to be performed on encrypted data without needing to decrypt it first. This would enhance the security of the forensic data by ensuring that even during analysis, the data remains protected from unauthorized access. Similarly, the use of blockchain technology could be explored for creating an immutable, distributed ledger that records all forensic actions and data, further enhancing the trustworthiness and transparency of the forensic process.

In terms of network traffic analysis, an improvement can involve the use of real-time threat detection and response mechanisms. Instead of merely capturing and storing network traffic for post-incident analysis, the system could be modified to include active threat detection tools that analyze network traffic as it flows through the system. These tools could immediately alert administrators to suspicious activities, or even automatically initiate containment or mitigation procedures, thereby reducing the time to respond to potential security incidents.

The forensic system could also be adapted for use in cloud-native environments where containers are deployed across multiple regions and availability zones. This would involve modifications to the Quarantine Network and Virtual Switch components to support multi-region isolation and traffic mirroring, ensuring that forensic data is captured and analyzed consistently, regardless of where the containers are running. Additionally, cloud-specific logs and metadata could be incorporated into the forensic analysis, providing a more comprehensive view of the container's behavior in a cloud environment.

Another potential modification includes the use of different types of storage systems for the forensic data. Instead of relying solely on traditional file-based or object storage systems, the system could be enhanced to support storage in distributed, fault-tolerant systems or other decentralized storage networks. This would increase the resilience of the forensic data, ensuring that it remains accessible even in the event of a failure in the primary storage system.

Furthermore, embodiments can provide customized and beneficial user interfaces and reporting mechanisms in the forensic system. For example, the system could be equipped with advanced visualization tools that allow investigators to easily navigate through large datasets, identify patterns, and correlate events across different timelines. These tools could include interactive dashboards, drill-down functionality, graph-based visualizations of network traffic, and/or time-line views that highlight significant events in the forensic process. Enhanced reporting features could automatically generate detailed forensic reports, complete with charts, graphs, and executive summaries, tailored to the needs of different stakeholders.

Lastly, alternative embodiments can integrate the forensic system with other security tools and platforms, such as SIEM (Security Information and Event Management) systems, endpoint detection and response (EDR) tools, or threat intelligence platforms. Such integrations would enable the forensic system to operate as part of a larger security ecosystem, contributing to a more comprehensive and coordinated defense strategy. By feeding forensic data into a SIEM, for example, the system could help correlate incidents across different parts of an organization's IT infrastructure, providing a broader context for security investigations.

All these alternative embodiments, improvements, modifications, and changes are intended to be within the sphere and scope of the invention as disclosed. The flexibility and adaptability of the forensic system ensure that it can be tailored to meet the evolving needs of different industries and technological landscapes, making it a robust and versatile tool for securing containerized environments against a wide range of threats.

The invention claimed is:

1. A method for performing digital forensics and incident response in a containerized environment, the method comprising:

converting, by a container runtime, a stateless container into a persistent container by preventing automatic shutdown or deletion of a container by a container orchestration system, including modifying a runtime configuration to disable time-based or event-based termination triggers;

quarantining, by a virtual switch and firewall, the persistent container by isolating it from the rest of a network, which includes configuring the virtual switch to reroute all traffic associated with the container to a secure, isolated network segment, and applying firewall rules to block unauthorized access to and from the container;

mirroring, by a network interface, network traffic associated with a quarantined container and capturing, by a packet capture tool, network artifacts for forensic analysis, wherein the network interface is configured to replicate all ingress and egress packets for storage in an immutable format;

capturing, by the container runtime, a snapshot of the persistent container, wherein the snapshot includes all layers of a container's filesystem, in-memory filesystems, and persistent volumes, with the snapshot process ensuring that all file handles, open connections, and active processes are preserved in their exact state at the moment of capture;

capturing, by a kernel monitoring tool, kernel syscalls made by the persistent container, along with environment variables passed to the container, including capturing syscalls related to process creation, memory allocation, and network communication to reconstruct a container's operational behavior;

capturing, by a process monitoring tool, process data associated with the persistent container, including command-line arguments, environment variables, process identifiers (IDs), and memory allocations, ensuring that all active and background processes are accounted for in a forensic record;

retrieving, by a log collection tool, logs and artifacts associated with the persistent container from a current environment and from any previous nodes on which the container was instantiated, including the retrieval of system logs, application logs, and network logs stored in both local and remote locations;

comparing, by a comparison tool, a current state of the persistent container with an original container image retrieved from an artifact repository to identify changes or anomalies, including generating a detailed report that highlights differences in file contents, configurations, and security settings;

duplicating, by a data duplication tool, all collected artifacts to an immutable storage, including hashing each piece of data before and after duplication to maintain a chain-of-custody and verify data integrity at each step of a process; and reverting, by the container runtime and orchestration system, the persistent container back to a stateless state after the forensic analysis is complete, including removing all quarantine measures, restoring network and system configurations to their original settings, and verifying that a container environment is free from residual forensic data.

2. The method of claim 1, further comprising automating the conversion of the stateless container to a persistent container upon detection of a security incident by a security monitoring tool, including setting up automatic triggers within the security monitoring tool to initiate the conversion process without manual intervention.

3. The method of claim 2, wherein the automation step further includes triggering the quarantining of the persistent container immediately following the conversion step, including activating predefined quarantine protocols that isolate the container and initiate real-time monitoring.

4. The method of claim 3, further comprising configuring, by the network interface, an Encapsulated Remote Switched Port Analyzer (ERSPAN) port to enhance the network traffic mirroring for environments utilizing specific virtual switches, including setting up an ERSPAN session to capture and forward network traffic to a designated analysis server.

5. The method of claim 4, wherein the capturing of the snapshot by the container runtime includes identifying and preserving a sequence of all filesystem layers, starting from a base layer to the most recent layer, ensuring accurate reconstruction during analysis, and documenting a relationship between each layer to facilitate forensic examination.

6. The method of claim 5, further comprising capturing, by the container runtime, object storage data associated with the container, in addition to the filesystem layers, memory filesystems, and persistent volumes, ensuring that all externally stored data linked to the container is included in a forensic snapshot.

7. The method of claim 6, wherein the capturing of kernel syscalls by the kernel monitoring tool further includes capturing all syscalls related to security-sensitive operations, including file access, network connections, user authentication, and process management, to provide a comprehensive record of a container's interactions with a host system.

8. The method of claim 7, wherein the process monitoring tool further captures real-time changes in the environment variables during the operation of the container, ensuring that any dynamic modifications to a container's runtime environment are recorded and preserved for analysis.

9. The method of claim 8, further comprising capturing, by the process monitoring tool, a memory footprint of the container, including any temporary filesystems and cache data utilized during its operation, to provide a complete view of the container's use of system resources.

10. The method of claim 9, wherein the retrieval of logs and artifacts includes accessing logs from distributed storage nodes where the container may have previously operated, ensuring that all historical data relevant to the container's activities is collected, regardless of its current location.

11. The method of claim 10, further comprising correlating, by the log collection tool, the retrieved logs with real-time data captured from a quarantined container to build a comprehensive activity timeline, including identifying patterns and sequences of events that are critical to understanding an incident.

12. The method of claim 11, wherein the comparison tool further identifies unauthorized or unexpected changes in a container's state by comparing the captured snapshot with predefined security policies, including generating alerts and reports that highlight any deviations from established security baselines.

13. The method of claim 12, wherein a comparison includes utilizing machine learning algorithms to detect patterns or anomalies that indicate potential security incidents, including training algorithms on historical data to improve accuracy of threat detection.

14. The method of claim 13, wherein the data duplication tool further verifies the integrity of the data in immutable storage by re-hashing the data after duplication and comparing it with original hash values, ensuring that the data remains unchanged and tamper-proof.

15. The method of claim 14, further comprising maintaining, by the data duplication tool, a detailed audit log of all operations performed during a forensic process, including timestamps, user actions, and system events, to provide a complete record of a forensic investigation.

16. The method of claim 15, wherein the reverting step includes verifying that all quarantine measures, network configurations, and system settings have been restored to their original state before resuming normal operations, ensuring that the container environment is fully reset to its pre-incident condition.

17. The method of claim 16, further comprising documenting, by the container runtime, the reversion process, including removal of forensic data and the restoration of the container to its stateless mode, providing a clear record of the steps taken to conclude the forensic investigation.

18. The method of claim 17, further comprising archiving, all forensic data, logs, and audit trails in a secure, long-term storage solution for future reference or legal compliance, ensuring that evidence is preserved for potential future investigations or legal proceedings.

19. A method for conducting digital forensics and incident response in a containerized environment, the method comprising:

converting, by a container runtime, a stateless container into a persistent container by modifying a runtime configuration to disable all time-based, event-based, and policy-based termination triggers, ensuring the persistent container remains active for an entire duration of a forensic investigation;

quarantining, by a virtual switch, firewall, and container orchestration system, the persistent container by isolating it from the rest of a network, including rerouting all container traffic through a secure, isolated network segment, and applying multi-layered firewall rules to restrict unauthorized access, while maintaining access for forensic tools;

mirroring, by a network interface and advanced packet capture tool, network traffic associated with a quarantined container, including all ingress, egress, and internal communications, and capturing these network artifacts in real-time, ensuring that all packets are stored in an immutable format for forensic analysis;

capturing, by the container runtime, a comprehensive snapshot of the persistent container, wherein the snapshot includes all layers of a container's filesystem, in-memory filesystems, persistent volumes, object storage data, and active process states, with precise documentation of relationships between each layer and ensuring the capture of all open file handles, active connections, and running processes;

capturing, by a kernel monitoring tool, all kernel syscalls made by the persistent container, including those related to process creation, file access, memory management, network communication, and user authentication, along with capturing all environment variables and their real-time changes during a container's operation;

capturing, by a process monitoring tool, detailed process data associated with the persistent container, including command-line arguments, process identifiers (IDs), memory allocations, real-time changes to environment variables, and any interactions with temporary filesystems and cache data, providing a complete forensic record of a persistent container's resource usage and operational behavior;

retrieving, by a log collection tool, all logs and artifacts associated with the persistent container, including those stored in local, remote, and distributed storage nodes, ensuring the collection of system logs, application logs, network logs, and any other relevant historical data from all nodes where the container may have previously operated;

correlating, by a forensic analysis tool, the retrieved logs and real-time data captured from the quarantined container to construct a comprehensive and chronological activity timeline, identifying key events, patterns, and sequences that are critical to understanding a scope and nature of an incident;

comparing, by a comparison tool utilizing machine learning algorithms, a current state of the persistent container with an original container image retrieved from an artifact repository, identifying unauthorized or unexpected changes, anomalies, and deviations from predefined security policies, and generating detailed reports and alerts based on these comparisons;

duplicating, by a data duplication tool, all collected artifacts to an immutable storage solution, including hashing each piece of data before and after duplication to maintain a strict chain-of-custody, verifying data integrity, and ensuring that all forensic data remains tamper-proof and accessible for future analysis;

automating, by an orchestration control module, an entire forensic process, from initial conversion of the stateless container to a persistent container, through quarantine, data capture, and duplication, to final reversion of the persistent container back to its stateless state, ensuring consistent and timely execution of all forensic steps;

reverting, by the container runtime and orchestration system, the persistent container back to a stateless state after the forensic analysis is complete, including removing all quarantine measures, restoring network and system configurations to their original state, ensuring that all forensic data and modifications are fully removed, and verifying that a container environment is returned to its pre-incident condition without any residual forensic footprints;

maintaining, by the data duplication tool, a detailed audit log of all operations performed during the forensic process, including timestamps, user actions, system events, and specific forensic data captured, to provide a complete and verifiable record of an investigation;

documenting, by the container runtime and forensic analysis tool, the reversion process, including the removal of all forensic data, restoration of the container to its stateless mode, and archiving of detailed forensic records, logs, and audit trails in a secure, long-term storage solution;

archiving, by a secure storage system, all forensic data, logs, audit trails, and documentation in a secure, long-term storage solution that ensures compliance with legal and regulatory requirements, preserves the integrity of evidence for future reference or legal proceedings, and provides secure access controls for authorized personnel;

verifying, by the data duplication and forensic analysis tools, the integrity and completeness of the forensic data stored in immutable storage, re-hashing the data and comparing it with original hash values to ensure that the data has remained unchanged and is tamper-proof; and utilizing, by the machine learning algorithms, historical forensic data to improve accuracy of anomaly detection, enhancing the system's ability to identify and respond to potential security incidents, and continuously updating detection models based on new forensic data collected from ongoing investigations.

20. A system for conducting digital forensics and incident response in a containerized environment containing at least one hardware processor for executing software stored in non-volatile memory, the system comprising:

a container runtime configured to convert a stateless container into a persistent container by modifying the runtime configuration to disable all time-based, event-based, and policy-based termination triggers, ensuring the container remains active for an entire duration of a forensic investigation, including overriding any automated lifecycle management processes within a container orchestration system that would otherwise terminate or replace the persistent container based on predefined schedules or resource allocation policies;

a virtual switch and firewall configured to quarantine the persistent container by isolating it from the rest of a network, which includes rerouting all container traffic through a secure, isolated network segment, applying multi-layered firewall rules that dynamically adjust to block unauthorized access based on real-time threat intelligence, and enabling secure access for authorized forensic tools and personnel while preventing any external communications that could compromise integrity of the forensic investigation;

a network interface and packet capture tool configured to mirror network traffic associated with a quarantined container, including capturing all ingress, egress, and inter-container communications, storing these network artifacts in real-time within an immutable, tamper-proof format, and ensuring that the captured packets are indexed and timestamped for accurate chronological reconstruction during forensic analysis;

the container runtime further configured to capture a comprehensive snapshot of the persistent container, wherein the snapshot includes all layers of the container's filesystem, in-memory filesystems, persistent volumes, object storage data, and active process states, with precise documentation of hierarchical relationships and dependencies between each layer, ensuring preservation of all file handles, active network connections, and running processes, and maintaining a state of any memory-resident data or temporary filesystems that may contain critical forensic evidence;

a kernel monitoring tool configured to capture all kernel syscalls made by the persistent container, including syscalls related to process creation, file access, memory management, network communication, user authentication, and system-level operations, along with capturing and recording a full history of environment variables passed to the persistent container, tracking any real-time changes to these variables during the persistent container's operation to provide a complete and granular record of the persistent container's interactions with a host operating system;

a process monitoring tool configured to capture detailed process data associated with the persistent container, including command-line arguments, process identifiers (IDs), memory allocations, real-time changes to environment variables, the state and behavior of all active and background processes, interactions with temporary filesystems and cache data, and any inter-process communications, providing a comprehensive forensic record that details a container's resource usage, operational behavior, and any deviations from expected norms;

a log collection tool configured to retrieve all logs and artifacts associated with the persistent container, including those stored in local storage, remote storage, distributed storage nodes, and centralized logging systems, ensuring a collection of system logs, application logs, network logs, security logs, and any other relevant historical data from all nodes and storage locations where the persistent container may have operated or left residual data, with capabilities to aggregate, filter, and correlate these logs for a coherent and complete forensic timeline;

a forensic analysis tool configured to correlate the retrieved logs and real-time data captured from the quarantined container, constructing a comprehensive, chronological activity timeline that identifies key events, patterns, sequences of operations, and potential indicators of compromise, and enabling identification and contextualization of security incidents, unauthorized activities, or anomalies within a broader operational context of the containerized environment;

a comparison tool utilizing advanced machine learning algorithms configured to compare a current state of the persistent container with an original container image retrieved from an artifact repository, identifying unauthorized or unexpected changes, security anomalies, deviations from predefined security policies, and any tampering or modifications to a container's filesystem, configurations, or runtime environment, generating detailed forensic reports, alerts, and recommendations based on these comparisons, and facilitating the automation of anomaly detection and threat identification;

a data duplication tool configured to duplicate all collected artifacts to an immutable storage solution, including hashing each piece of data before and after duplication to maintain a strict and verifiable chain-of-custody, conducting continuous integrity checks during a duplication process, and ensuring that all forensic data is stored in a tamper-proof, encrypted format that is protected against unauthorized access or modification, and that complies with industry-standard forensic best practices and legal requirements for evidence preservation;

an orchestration control module configured to automate an entire forensic process, from initial conversion of the stateless container to a persistent container, through quarantine, network traffic mirroring, data capture, and duplication, to final reversion of the persistent container back to its stateless state, ensuring consistent, timely, and repeatable execution of all forensic steps across multiple containers and environments, with the capability to scale the forensic process across large, distributed, or cloud-based environments, and to adapt to different container orchestration platforms and configurations;

the container runtime and orchestration system further configured to revert the persistent container back to a stateless state after the forensic analysis is complete, including automated removal of all quarantine measures, restoration of network configurations, system settings, and firewall rules to their original state, the verification that all forensic data, configurations, and modifications have been fully removed, and validation that the container environment has been returned to its pre-incident condition, with no residual forensic footprints that could impact ongoing operations or future forensic investigations;

the data duplication tool further configured to maintain a detailed, tamper-proof audit log of all operations performed during the forensic process, including precise timestamps, user actions, system events, forensic data captured, and any deviations from standard procedures, providing a comprehensive and verifiable record of the forensic investigation that can be used for internal audits, compliance checks, and legal proceedings;

the container runtime and forensic analysis tool further configured to document the entire reversion process, including the removal of all forensic data, the restoration of the container to its original stateless mode, the validation that a container's runtime environment has been fully reset, and secure archiving of all detailed forensic records, logs, audit trails, and documentation in a secure, long-term storage solution;

a secure storage system configured to archive all forensic data, logs, audit trails, and documentation in a secure, long-term storage solution that ensures full compliance with legal, regulatory, and industry standards for evidence preservation, providing secure access controls, encryption, and retention policies to protect integrity of the evidence for future reference, forensic analysis, or legal proceedings, and enabling authorized personnel to securely retrieve and review archived data as needed;

the data duplication and forensic analysis tools further configured to verify integrity and completeness of the forensic data stored in immutable storage, by re-hashing the data and comparing it with the original hash values, conducting automated integrity checks at regular intervals, and generating alerts in the event of any discrepancies or unauthorized attempts to access or modify the data, ensuring that the forensic data remains unchanged, tamper-proof, and fully admissible as evidence; and the machine learning algorithms further configured to utilize historical forensic data to improve accuracy of anomaly detection, continuously learning from new forensic data collected from ongoing investigations, updating detection models to recognize evolving threat patterns, and enhancing the system's ability to identify, respond to, and predict potential security incidents, with the capability to provide proactive recommendations and automated responses to mitigate identified threats.

* * * * *